US009753122B2

(12) United States Patent
Duvoisin, III et al.

(10) Patent No.: US 9,753,122 B2
(45) Date of Patent: Sep. 5, 2017

(54) SENSOR HEAD

(71) Applicant: L-3 Communications Security and Detection Systems, Inc., Woburn, MA (US)

(72) Inventors: Herbert Duvoisin, III, Orlando, FL (US); Juan Antonio Torres-Rosario, Orlando, FL (US); Christopher Gary Sentelle, Orlando, FL (US); Douglas O. Carlson, Winter Garden, FL (US); Glen A. Holman, Orlando, FL (US); Marquette Trishaun, Orlando, FL (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 238 days.

(21) Appl. No.: 14/460,958

(22) Filed: Aug. 15, 2014

(65) Prior Publication Data

US 2015/0285899 A1 Oct. 8, 2015

Related U.S. Application Data

(63) Continuation of application No. 13/081,153, filed on Apr. 6, 2011, now Pat. No. 8,842,035.
(Continued)

(51) Int. Cl.
*G01S 7/35* (2006.01)
*G01S 13/88* (2006.01)
(Continued)

(52) U.S. Cl.
CPC .............. *G01S 7/354* (2013.01); *G01S 7/412* (2013.01); *G01S 13/0209* (2013.01);
(Continued)

(58) Field of Classification Search
CPC ...... G01S 13/04; G01S 13/885; G01S 13/887; G01S 13/56; G01S 13/888; G01S 7/411;
(Continued)

(56) References Cited

U.S. PATENT DOCUMENTS

| 3,896,371 A | 7/1975 | Hametta |
| 4,021,725 A | 5/1977 | Kirkland |

(Continued)

FOREIGN PATENT DOCUMENTS

| EP | 1338902 B1 | 5/2006 |
| GB | 2343805 A | 5/2000 |

(Continued)

OTHER PUBLICATIONS

"Autonomous mine detection system (AMDS) incorporating SFCW GPR and CWMD sensors for discrimination", Douglas O. Carlson et al, 2010.*

(Continued)

*Primary Examiner* — John B Sotomayor
(74) *Attorney, Agent, or Firm* — Fish & Richardson P.C.

(57) ABSTRACT

An apparatus includes an extendable wand, and a sensor head coupled to the wand. The sensor head includes a continuous wave metal detector (CWMD) and a radar. When the wand is collapsed, the wand and the sensor head collapse to fill a volume that is smaller than a volume filled by the sensor head and the wand when the wand is extended. Frequency-domain data from a sensor configured to sense a region is accessed, the frequency-domain data is transformed to generate a time-domain representation of the region, a first model is determined based on the accessed frequency-domain data, a second model is determined based on the generated time-domain representation, the second model being associated with a particular region within the sensed region, and a background model that represents a
(Continued)

background of the region is determined based on the first model and the second model.

20 Claims, 19 Drawing Sheets

Related U.S. Application Data

(60) Provisional application No. 61/322,284, filed on Apr. 8, 2010, provisional application No. 61/409,899, filed on Nov. 3, 2010, provisional application No. 61/411,759, filed on Nov. 9, 2010, provisional application No. 61/448,869, filed on Mar. 3, 2011.

(51) Int. Cl.

| | |
|---|---|
| *G01S 7/41* | (2006.01) |
| *G01S 13/02* | (2006.01) |
| *G01S 13/34* | (2006.01) |
| *G01S 13/86* | (2006.01) |
| *G01V 3/12* | (2006.01) |

(52) U.S. Cl.
CPC ............ *G01S 13/347* (2013.01); *G01S 13/86* (2013.01); *G01S 13/885* (2013.01); *G01V 3/12* (2013.01)

(58) Field of Classification Search
CPC ........... G01S 7/412; G01S 7/414; G01V 3/12; G01V 3/15; G01V 3/17
USPC .............. 342/22, 27, 90, 196; 324/326, 329
See application file for complete search history.

(56) References Cited

U.S. PATENT DOCUMENTS

| | | |
|---|---|---|
| 4,099,116 A | 7/1978 | Tyndall |
| 4,099,118 A | 7/1978 | Franklin et al. |
| 4,334,192 A | 6/1982 | Podhrasky |
| 4,439,734 A | 3/1984 | Weber |
| 4,719,426 A | 1/1988 | Weiss |
| 4,912,414 A | 3/1990 | Lesky et al. |
| 4,951,055 A | 8/1990 | Katayama |
| 5,192,952 A | 3/1993 | Johler |
| 5,307,272 A | 4/1994 | Butler et al. |
| 5,325,095 A | 6/1994 | Vadnais et al. |
| 5,453,931 A | 9/1995 | Watts, Jr. |
| 5,499,029 A | 3/1996 | Bashforth et al. |
| 5,592,170 A | 1/1997 | Price et al. |
| 5,648,786 A | 7/1997 | Chung et al. |
| 5,680,048 A | 10/1997 | Wollny |
| 5,786,696 A | 7/1998 | Weaver et al. |
| 5,835,054 A | 11/1998 | Warhus et al. |
| 6,026,135 A | 2/2000 | McFee et al. |
| 6,097,190 A | 8/2000 | Foerster |
| 6,222,481 B1 | 4/2001 | Abrahamson et al. |
| 6,333,631 B1 | 12/2001 | Das et al. |
| 6,377,872 B1 | 4/2002 | Struckman |
| 6,415,666 B1 | 7/2002 | Donskoy et al. |
| 6,445,334 B1 | 9/2002 | Bradley et al. |
| 6,501,414 B2 | 12/2002 | Arndt et al. |
| 6,600,441 B2 | 7/2003 | Liedtke et al. |
| 6,609,451 B1 | 8/2003 | Inoue et al. |
| 6,617,996 B2 | 9/2003 | Johansson et al. |
| 6,657,577 B1 | 12/2003 | Gregersen et al. |
| 6,664,914 B2 | 12/2003 | Longstaff et al. |
| 6,667,709 B1 | 12/2003 | Hansen et al. |
| 6,670,906 B1 | 12/2003 | Roberts et al. |
| 6,679,153 B2 | 1/2004 | Inoue et al. |
| 6,724,191 B1 | 4/2004 | Larsen |
| 6,741,201 B1 | 5/2004 | De Jongh et al. |
| 6,791,329 B2 | 9/2004 | Nelson |
| 6,809,520 B1 | 10/2004 | Nelson |
| 6,819,109 B2 | 11/2004 | Sowers et al. |
| 6,853,194 B2 | 2/2005 | Nelson et al. |
| 6,879,161 B2 | 4/2005 | Rowan |
| 6,894,639 B1 | 5/2005 | Katz |
| 6,911,823 B2 | 6/2005 | Rowan |
| 6,950,054 B1 | 9/2005 | Steinway et al. |
| 6,967,574 B1 | 11/2005 | Nelson |
| 6,999,021 B2 | 2/2006 | Taylor, Jr. et al. |
| 7,042,385 B1 | 5/2006 | Wichmann |
| 7,064,701 B2 | 6/2006 | Steinway et al. |
| 7,078,906 B2 | 7/2006 | Nelson |
| 7,106,194 B2 | 9/2006 | Nelson |
| 7,123,016 B2 | 10/2006 | Larsen |
| 7,157,913 B2 | 1/2007 | Nelson |
| 7,173,560 B2 | 2/2007 | Li et al. |
| 7,265,551 B2 | 9/2007 | Kellermann |
| 7,310,060 B2 | 12/2007 | Stilwell et al. |
| 7,333,045 B1 | 2/2008 | Aomori et al. |
| 7,355,409 B2 | 4/2008 | Larsen |
| 7,362,260 B2 | 4/2008 | Cloutier et al. |
| 7,414,404 B2 | 8/2008 | Keene |
| 7,432,715 B2 | 10/2008 | Stamatescu |
| 7,482,968 B2 | 1/2009 | Wuersch et al. |
| 7,511,654 B1 | 3/2009 | Goldman et al. |
| 7,518,542 B1 | 4/2009 | Steinway et al. |
| 7,532,127 B2 | 5/2009 | Holman et al. |
| 7,535,407 B2 | 5/2009 | Cloutier et al. |
| 7,545,140 B2 | 6/2009 | Humphreys et al. |
| 7,683,821 B1 | 3/2010 | Clodfelter |
| 7,705,598 B2 | 4/2010 | Larsen |
| 7,834,801 B2 | 11/2010 | Waite et al. |
| 7,956,794 B2 | 6/2011 | Skultety-Betz et al. |
| 8,063,777 B2 | 11/2011 | Candy |
| 8,103,604 B2 | 1/2012 | Bowring et al. |
| 8,120,524 B2 | 2/2012 | Zemany |
| 8,174,429 B2 | 5/2012 | Steinway et al. |
| 8,237,560 B2 | 8/2012 | Candy |
| 8,264,400 B2 | 9/2012 | Yapa et al. |
| 8,310,236 B2 | 11/2012 | Duvoisin, III et al. |
| 8,665,131 B2 | 3/2014 | Eusebi Borzelli et al. |
| 8,674,875 B2 | 3/2014 | Carter et al. |
| 2002/0011947 A1 | 1/2002 | Stolarczyk et al. |
| 2002/0175849 A1 | 11/2002 | Arndt et al. |
| 2003/0034778 A1 | 2/2003 | Nelson |
| 2003/0136249 A1 | 7/2003 | Inoue et al. |
| 2003/0160617 A1 | 8/2003 | Rowan |
| 2003/0193429 A1 | 10/2003 | Campana et al. |
| 2006/0284758 A1 | 12/2006 | Stilwell et al. |
| 2008/0036462 A1 | 2/2008 | Schiano |
| 2008/0054893 A1 | 3/2008 | Humphreys et al. |
| 2008/0246647 A1 | 10/2008 | Hellsten |
| 2009/0195435 A1 | 8/2009 | Kapilevich et al. |
| 2009/0318098 A1 | 12/2009 | Stamatescu et al. |
| 2010/0085234 A1 | 4/2010 | Steinway et al. |
| 2010/0141247 A1 | 6/2010 | Candy |
| 2010/0277358 A1 | 11/2010 | Duvoisin, III et al. |
| 2010/0277397 A1 | 11/2010 | Scott |

FOREIGN PATENT DOCUMENTS

| | | |
|---|---|---|
| GB | 2360891 A | 10/2001 |
| WO | WO2006098751 A3 | 11/2007 |
| WO | WO2009155668 A1 | 12/2009 |

OTHER PUBLICATIONS

"L-3 Communications' CyTerra to provide hand-held mine detectors to U.S. Army as part of $300 million multi-year contract", Military and Aerospace Electronics, Aug. 10, 2006.*
"Final Report Shield Project 12rh—Advanced Handheld Mine Detection", J.E. McFee et al, Technical Report DRDC Suffield TR 2005-159, Dec. 2005.*
"Semi Autonomous Mine Detection System", SPIE Defense Security and Sensing, Doug Few et al, Apr. 2010.*
"Minehound VMR2: Dual Sensor Mine Detector," Product Brochure, Vallon GmbH, Jul. 2010, 2 pages.
"VMC1 Mine Detector: The Compact Detector for Special Tasks," Product Brochure, Vallon GmbH, Aug. 2007, 2 pages.

(56) References Cited

OTHER PUBLICATIONS

"Vallon Collapsible Metal Detector VMC1 (Germany), Mine Warfare Equipment," Jane's Information Group, 2009, reprinted from http://articles.janes.com/articles/Janes-Military-Vehicles-and-Logistics/Vallon-collapsible-metal-detector-VMC1-Germany.html on Mar. 22, 2011, 2 pages.

"Vallon Minehound{TM} VMR2 Dual Sensor Detector (Germany), Search and Detection," Jane's Information Group, Mar. 16, 2011, 2 pages, reprinted from http://articles.janes.com/articles/Janes-Police-and-Homeland-Security-Equipment/Vallon-Minehound-TM-VMR2-dual-sensor-detector-Germany.html on Mar. 22, 2011.

Jägerbro, P., et al, "Combination of GPR and Metal Detector for Mine Detection," Conference Paper, Second International Conference on Detection of Abandoned Land Mines, IEEE Conf. Publ. No. 458, Oct. 12, 1998, pp. 177-181.

Duvoisin, III, H.A., et al, "Multi-Sensor System for Mine Detection," Infrared Technology and Applications XXIV, Jul. 19, 1998, San Diego, CA, pp. 705-716.

Hatchard, C., "AN/PSS-14 (HSTAMIDS—Handheld Standoff Mine Detection System)," NDRF—Summer Conference, Aug. 27, 2003.

Konduri, R., et al, "Genetic Optimization of the HSTAMIDS Landmine Detection Algorithm," Detection and Remediation Technologies for Mines and Minelike Targes IX, Harmon, Broach, Holloway, eds., Proceedings of SPIE, vol. 5415, pp. 883-891, Apr. 1, 2004.

Verlinde, P., et al., "Multisensor Mine Signatures," Final Report: ITEP Project 2.5.1.2, Jul. 2003, reprinted from: http://demining.jrc.it/msms/MsmsFinalReportpdf.

Sun, Y., and Li, J., "Time-Frequency Analysis for Plastic Landmine Detection via Forward-Looking Ground Penetrating Radar," IEEE Proceedings—Radar, Sonar and Navigation, vol. 150, Issue 4, pp. 253-261, Aug. 2003.

International Search Report and Written Opinion for International Application No. PCT/US2010/049131, mailed Feb. 7, 2011, 12 pages.

Kim, K. and Waymond, R.S., Jr., "Design of a Resistively Loaded Vee Dipole for Ultrawide-Band Ground-Penetrating Radar Applications," IEEE Transactions on Antennas and Propagation, vol. 53, No. 8, Aug. 2005, pp. 2525-2532.

International Search Report and Written Opinion for International Application No. PCT/US10/00641, mailed May 4, 2010, 11 pages.

International Search Report and Written Opinion for International Application No. PCT/US10/00642, mailed May 5, 2010, 10 pages.

Kim, K., and Scott, W.R. Jr., "Design and Realization of a Discretely Loaded Resistive Vee Dipole for Ground-Penetrating Radars," Radio Science, vol. 39, No. 4, Jul. 1, 2004, pp. 1-9.

Song, J., et al., "High-Resolution 3-D Radar Imaging through Nonuniform Fast Fourier Transform (NUFFT)," Communications in Computational Physics, vol. 1, No. 1, pp. 176-191, Feb. 2006.

Venkatesan, J., and Scott, W.R., Jr., "Measured Patterns of a Resistive V-Dipole fed with a Double•Y Balun," Microwave and Optical Technology Letters, vol. 48, No. 2, Feb. 2006, pp. 380-383.

Counts, T., et al., "Multistatic Ground-Penetrating Radar Experiments," IEEE Transactions on Geoscience and Remote Sensing, vol. 45, No. 8, Aug. 2007, pp. 2544-2553.

Venkatesan, J., and Scott, W.R., Jr., "Investigation of the Double-Y Balun for Feeding Pulsed Antennas," Proceedings of the SPIE, vol. 5089, Apr. 2003, 11 pages.

Kim, K., and Scott, W.R. Jr., "Design and Realization of a Discretely Loaded Resistive Vee Dipole on a Printed Circuit Board," Proceedings of the SPIE, vol. 5089, Apr. 2003, 12 pages.

Kim, K., and Scott, W.R. Jr., "A Resistive Linear Antenna for Ground-Penetrating Radars," Proceedings of the SPIE, vol. 5415, No. 58, Apr. 2004, pp. 359-370.

Venkatesan, J.B., and Scott, W.R., Jr., "Design of the Double-Y Balun for use in GPR Applications," Proceedings of the SPIE, vol. 5415, No. 61, Apr. 2004, pp. 383-398.

Kim, K., and Scott, W.R. Jr., "Improved Resistively-Loaded Vee Dipole for Ground-Penetrating Radar Applications," IEEE Antennas and Propagation Society International Symposium, vol. 3, pp. 2548-2551, Jun. 2004.

Kim, K., et al., "A Multi-Static Ground-Penetrating Radar with an Array of Resistively-Loaded Vee Dipole Antennas for Landmine Detection," Proceedings of the SPIE, vol. 5794, Apr. 2005, pp. 495-506.

Kim, K., and Scott, W.R. Jr., "Investigation of Resistive Vee Antennas for a Multi-Static Ground-Penetrating Radar," IEEE AP-S International Symposium and USNC/URSI National Radio Science Meeting, Jul. 2005, 4 pages.

Gürbuz, A.C., et al., "Application of Multi-Static Inversion Algorithms to Landmine Detection," Proceedings of the SPIE: 2006 Annual International Symposium on Aerospace/Defense Sensing, Simulation, and Controls, vol. 6217, May 2006, 10 pages.

Scott, W.R., Jr., et al., "Combined Seismic, Radar, and Induction Sensor for Landmine Detection," J. Acoust. Soc. Am., vol. 123, No. 5, Pt. 2, May 2004, 1 page.

Kim, K., "Numerical and Experimental Investigation of Impulse-Radiating Antennas for use in Sensing Applications," Ph.D. Dissertation, Georgia Institute of Technology, School of Electrical and Computer Engineering, Atlanta, GA, Apr. 2003, Chapter V: Resistive Vee Dipoles, pp. 126-135.

Venkatesan, J.B., "Investigation of the Double-Y Balun for Feeding Pulsed Antennas," Ph.D. Disseration, Georgia Institute of Technology, Jul. 2004, Chapter 1: Introduction, pp. 1-16.

Scott, W.R., Jr., and Malluck, M., "New Cancellation Technique for Electromagnetic Induction Sensors," Proceedings of the SPIE, vol. 5794, Apr. 2005, pp. 328-335.

Scott, W.R., Jr., "Broadband Electromagnetic Induction Sensor for Detecting Buried Landmines," 2007 IEEE International Geoscience and Remote Sensing Symposium, Barcelona, Spain, Jul. 2007, pp. 22-25.

Fails, E.B., et al., "Performance of a Four Parameter Model for Modeling Landmine Signatures in Frequency Domain Wideband Electromagnetic Induction Detection Systems," Proceedings of the SPIE, vol. 6553, May 2007, 8 pages.

Scott, W.R., Jr., "Broadband Array of Electromagnetic Induction Sensors for Detecting Buried Landmines," 2008 IEEE International Geoscience and Remote Sensing Symposium, Boston, MA, Jul. 2008, pp. II-375-II-378.

Kolba, M.P., et al., "Information-Based Sensor Management for Landmine Detection Using Electromagnetic Induction, Ground-Penetrating Radar, and Seismic Sensors," J. Acoust. Soc. Am., vol. 123, No. 5, Pt 2, May 2008, p. 3042.

Scott, W.B., Jr., et al., "Investigation of a Combined Seismic, Radar, and Induction Sensor for Landmine Detection," J. Acoust. Soc. Am., vol. 115, No. 5, Pt. 2, May 2004, p. 2415.

Fails, E.B., et al., "Performance Comparison of Frequency Domain Quadrupole and Dipole Electromagnetic Induction Sensors in a Landmine Detection Application," Proceedings of the SPIE, vol. 6953, Apr. 2008, 11 pages.

Wei, M-H, et al., "Estimation and Application of Discrete Spectrum of Relaxations for Electromagnetic Induction Responses," 2009 IEEE International Geoscience and Remote Sensing Symposium, Cape Town, South Africa, Jul. 2009, pp. II-105-II-108.

Larson, G.D., and Scott, W.R., Jr., "Automated, Non-Metallic Measurement Facility for Testing and Development of Electromagnetic Induction Sensors for Landmine Detection," Proceedings of the SPIE, vol. 7303, Apr. 2009, 13 pages.

Gurbuz, A.C., et al., "Location Estimation using a Broadband Electromagnetic Induction Array," Proceedings of the SPIE, vol. 7303, Apr. 2009, 9 pages.

Pavel Ripka et al., "Eddy Curent Metal Detectors—Pulse vs. CW," Journal of Electrical Engineering, vol. 57, N. 8/S, 2006, 175-177.

G. Cross, "Soil Electromagnetic Properties and Metal Detector Performance," Terrascan Geophysics, Defence Research & Development Canada, Contract Report, DRDC Suffield CR 2009-062, Nov. 2008 (180 total pages).

Schweitzer, K.M., et al., "Optimization of Army-Navy/Portable Special Search (AN/PSS)-14 Operator Training," Army Research Laboratory, ARL-TR-3970, Oct. 2006.

(56) References Cited

OTHER PUBLICATIONS

Ritter, Kellyn D., "AN/PSS-14 Mine Detection System Offers Improved Countermine Capability," Army AL&T, Jan.-Mar. 2007.

* cited by examiner

SENSOR HEAD

CROSS-REFERENCE TO RELATED APPLICATIONS

This application is a continuation of U.S. patent application Ser. No. 13/081,153, filed Apr. 6, 2011, and titled SENSOR HEAD, now allowed, which claims the benefit of U.S. Provisional Application No. 61/322,284, filed Apr. 8, 2010, and titled SENSOR HEAD INCLUDING A TRANSCEIVER; U.S. Provisional Application No. 61/409,899, filed Nov. 3, 2010, and titled SENSOR HEAD INCLUDING A TRANSCEIVER; U.S. Provisional Application No. 61/411,759, filed Nov. 9, 2010, and titled SENSOR HEAD INCLUDING A TRANSCEIVER; and U.S. Provisional Application No. 61/448,869, filed Mar. 3, 2011, and titled OBJECT AND WIRE DETECTION. The disclosures of these prior provisional applications are incorporated by reference in their entirety.

TECHNICAL FIELD

This disclosure relates to a sensor head.

BACKGROUND

A large percentage of land mines contain some amount of metal. Many versions of mines use metal for firing pins, shrapnel, and portions of the casing. If a mine has a sufficient quantity of a detectable metal, that mine can be found using a metal detector.

SUMMARY

A collapsible apparatus that includes a sensor head with both a GPR and a continuous-wave metal detector is disclosed. In some implementations, the sensor head also includes a transceiver that is electrically coupled to and in communication with the GPR. Techniques for processing data from the GPR to determine whether a low-metal or no-metal threat object (such as small wires associated with explosives or bulk explosives that include little to no metal) are described.

In one general aspect, an apparatus includes an extendable wand, and a sensor head coupled to the wand. The sensor head includes a continuous wave metal detector (CWMD) and a radar. When the wand is collapsed, the wand and the sensor head collapse to fill a volume that is smaller than a volume filled by the sensor head and the wand when the wand is extended.

Implementations may include one or more of the following features. The CWMD may transmit and receive radiation at twenty-one or more different frequencies. The radar may be a ground penetrating radar. The ground penetrating radar may include one receive antenna configured to detect electromagnetic radiation and one transmit antenna configured to transmit electromagnetic radiation. The ground penetrating radar may include two or more receive antennas, each configured to detect electromagnetic radiation, and at least one transmit antenna configured to transmit electromagnetic radiation. The apparatus also may include a transceiver electrically coupled to the receive antenna and the transmit antenna. The transceiver, the receive antenna, the transmit antenna, and the CWMD may be located in the sensor head. The receive antenna and the transmit antenna may be located in the sensor head, and the transceiver may be located outside of the sensor head. When the wand and sensor head are collapsed, the apparatus may fill a volume that no larger than about thirty-six centimeters (cm) by twenty-six cm by eleven cm.

The apparatus also may include a processor and electronic storage in communication with the sensor head, and the electronic storage may include instructions that, when executed, cause the processor to access data from the CWMD and from the radar, determine a signature of an object detected by one or more of the CWMD or the radar based on the accessed data. The apparatus also may include an output device configured to provide an indication of a detection of an object made by one or more of the CWMD or the radar.

In another general aspect, frequency-domain data from a sensor configured to sense a region is accessed, the frequency-domain data is transformed to generate a time-domain representation of the region, a first model is determined based on the accessed frequency-domain data, a second model is determined based on the generated time-domain representation, the second model being associated with a particular region within the sensed region, and a background model that represents a background of the region is determined based on the first model and the second model.

Implementations may include one or more of the following features. The sensor may include a ground penetrating radar. Additional frequency-domain data may be received from the sensor after determining the background model, the additional frequency-domain data may be compared to the background model, it may be determined that the additional frequency-domain data represents a target based on the comparison, and an alarm may be triggered based on the determination that the additional frequency-domain data represents a target. It may be determined whether the first model and the second model include outliers. The first model may include a ground coupling model that represents frequencies emphasized by operator motion, and the second model may include a model that represents a surface of the ground and one or more target models, each target model associated with a particular depth beneath the surface. In some implementations, additional frequency-domain data may be received from the sensor after determining the background model, it may be determined whether the additional frequency-domain data is an outlier, and the background model may be recomputed using the additional frequency-domain data if the additional frequency-domain data is an outlier.

In another general aspect, a system includes a sensor configured to sense a region at each of multiple frequencies, a processor coupled to the sensor and an electronic storage, the electronic storage including instructions that, when executed, cause the processor to receive frequency-domain data from the sensor, transform the frequency-domain data to generate a time-domain representation of the accessed frequency-domain data, determine a first model based on the accessed frequency-domain data, determine a second model based on the generated time-domain representation, the second model being associated with a particular region within the sensed region, and determine a background model that represents a background of the region, based on the first model and the second model.

Implementations may include one or more of the following features. The sensor may include a ground penetrating radar. The sensor may include a continuous wave metal detector (CWMD). The sensor may include a CWMD and a ground penetrating radar. The CWMD may transmit and receive radiation at twenty-one or more different frequencies. The ground penetrating radar and the continuous wave metal detector may be received in a single sensor head. The sensor is mounted on a platform that is configured to be held and manually operated by a human operator.

In another general aspect, an apparatus includes an extendable wand, a continuous wave metal detector (CWMD) configured to radiate electromagnetic radiation and detect electromagnetic radiation at six or more different frequencies and coupled to the extendable wand, and a processor and an electronic storage coupled to the CWMD, the electronic storage including instructions that, when executed, cause the processor to access data detected by the CWMD and determine a signature of an object represented by the accessed data.

Implementations may include one or more of the following features. The CWMD may be configured to radiate and detect radiation at twenty-one or more different frequencies.

In another general aspect, an apparatus includes an extendable wand, a metal detector configured to radiated and detect radiation and coupled to the extendable wand, a processor and an electronic storage coupled to the metal detector, the electronic storage including instructions that, when executed, cause the processor to access data detected by the metal detector and determine that a non-ferrous object is represented by the accessed data.

Implementations of the techniques discussed above may include a method or process, a system or apparatus, a sensor head, a sensor, a kit, or computer software stored on a computer-accessible medium. The details of one or more implementations are set forth in the accompanying drawings and the description below. Other features will be apparent from the description and drawings, and from the claims.

BRIEF DESCRIPTION OF THE DRAWINGS

Like reference numbers refer to like elements.

DETAILED DESCRIPTION

Figure 1A:
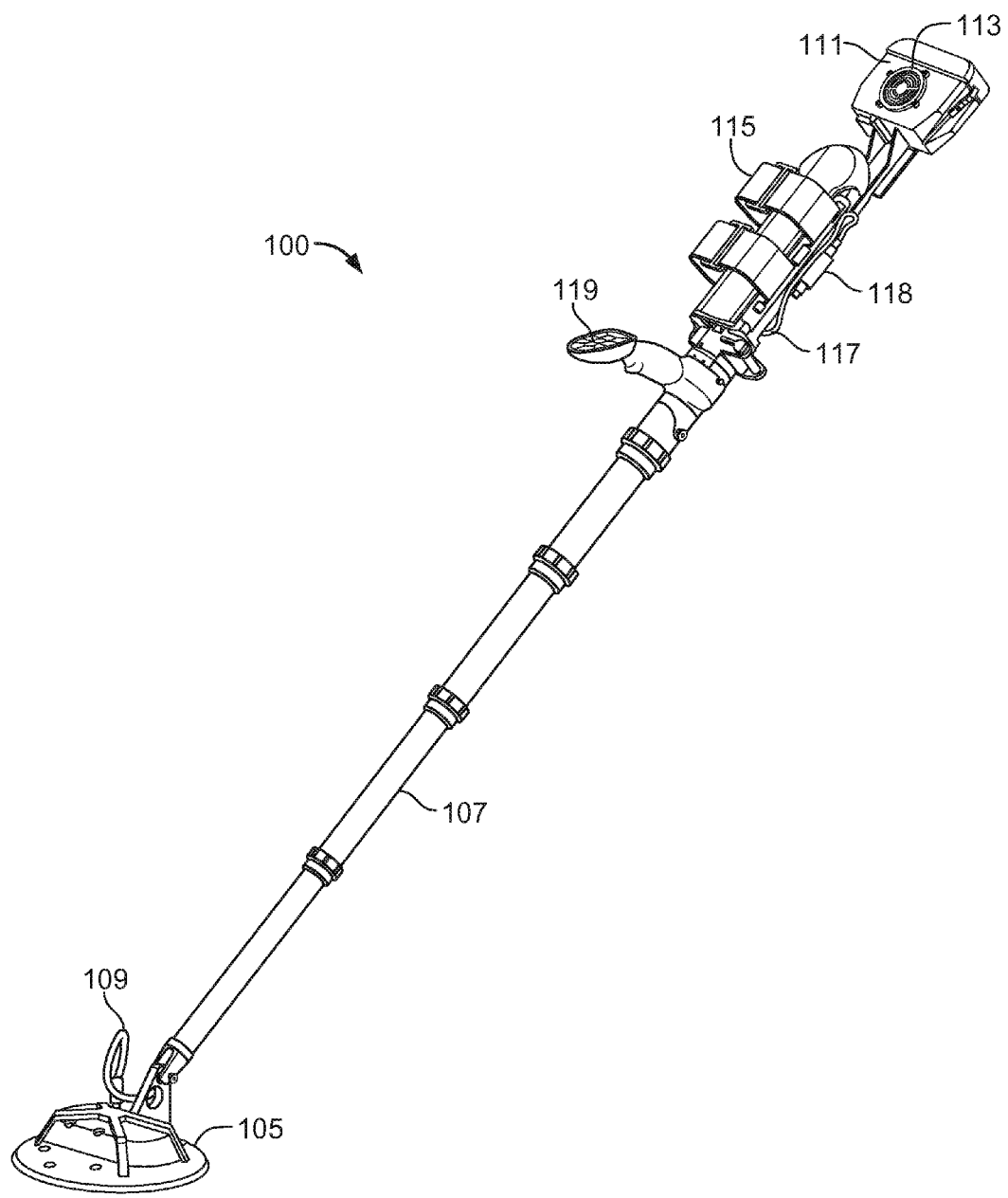
FIGS. 1A and 1B show plan views of a detection system.

A detection system for scanning a region is disclosed. The region may be, for example, the surface and subsurface of the ground or a space in the vicinity of a stationary portal through which persons and objects (such as luggage and cargo) pass. The region may be all or a portion of a person who is scanned with the detection system by a human operator. The detection system may be used to detect landmines and/or bulk explosives that are not necessarily included in a landmine. The system also may be used to detect metallic objects, such as small wires, objects that may or may not include metal, such as improvised explosive devices (IEDs), and non-metallic objects, such as explosives that are buried in the ground or obscured by, for example, being hidden on the body of a person.

The system is lightweight, portable (by, for example, being hand-carryable and/or wearable), and has a rugged design and construction configured to withstand impacts and extreme climate conditions (for example, high winds, rain, snow, ice, and sand). By employing integrated electronics, sensor design, and light-weight construction techniques (for example, carbon fiber composite construction techniques) the system (which may be referred to as MINI-HSTAMIDS or MINI-H), has reduced size, weight and power compared to prior detection systems, while also having increased structural integrity. In some implementations, the system weighs about six pounds (about 2.7 kilograms) and collapses to a 14.3"×10.4"×4.6" (about 36 cm×26 cm×11 cm) volume for belt, hand-carry, or backpack transport.

The sensor head may include radar antennas that transmit and receive electromagnetic radiation and are electrically coupled to a transceiver. The radar antennas may be part of a ground penetrating radar (GPR). The transceiver may be integrated into the sensor head or may be on the sensor head. In some implementations, the transceiver is located separate from the sensor head but is in communication with the sensor head. For example, the transceiver may be located in an electronics unit or an electronics housing that is coupled to a wand that is attached to the sensor head.

Inclusion of the transceiver in the sensor head simplifies cabling requirements between the sensor head and an electronics unit that is remote from the sensor head. For example, in some implementations, a thin, easily coiled universal serial bus (USB) data wire is employed instead of two relatively thick and long bend-radius coaxial cables. Some prior systems used coaxial cables to communicate data to an electronics unit separate and removed from the sensor head. For example, in some prior systems, the transceiver was located in a vehicle to which the sensor head was mounted. Integration of the transceiver with the sensor head results in the system being collapsible, small, and lightweight. Replacement of the thick non-coiling coax with the thin coiled wires, achievable due to the placement of the transceiver on, in, or near the sensor head, allows for the collapsible design.

Additionally, use of the thin, coil-able data wire may result in greater system performance due to the thin data wire providing lower noise data transmission and lower signal loss as compared to systems that use coaxial cable for data transfer. The replacement of the coaxial cables with the thin, coil-able single data cable may result in a two-fold or greater reduction in false alarm rate.

The sensor head also may include a continuous-wave metal detector (CWMD). The dynamic range of the CWMD allows the GPR and electronics associated with the GPR to be housed in the sensor head with the CWMD, integrated into the sensor head along with the CWMD, or otherwise placed near (for example, about a foot or less) the CWMD. Due to the dynamic range of the CWMD, the CWMD, or data from the CWMD, may be adjusted or otherwise compensated to account for the metal in the transceiver, whereas pulsed metal detectors generally cannot be compensated. The ability of the CWMD to adjust to the transceiver metal allows for the transceiver to be placed in the sensor head or near the sensor head. Moreover, a CWMD may be able to detect items that a typical pulsed metal detector is not able to detect, such as non-ferrous metals.

Figure 1B:
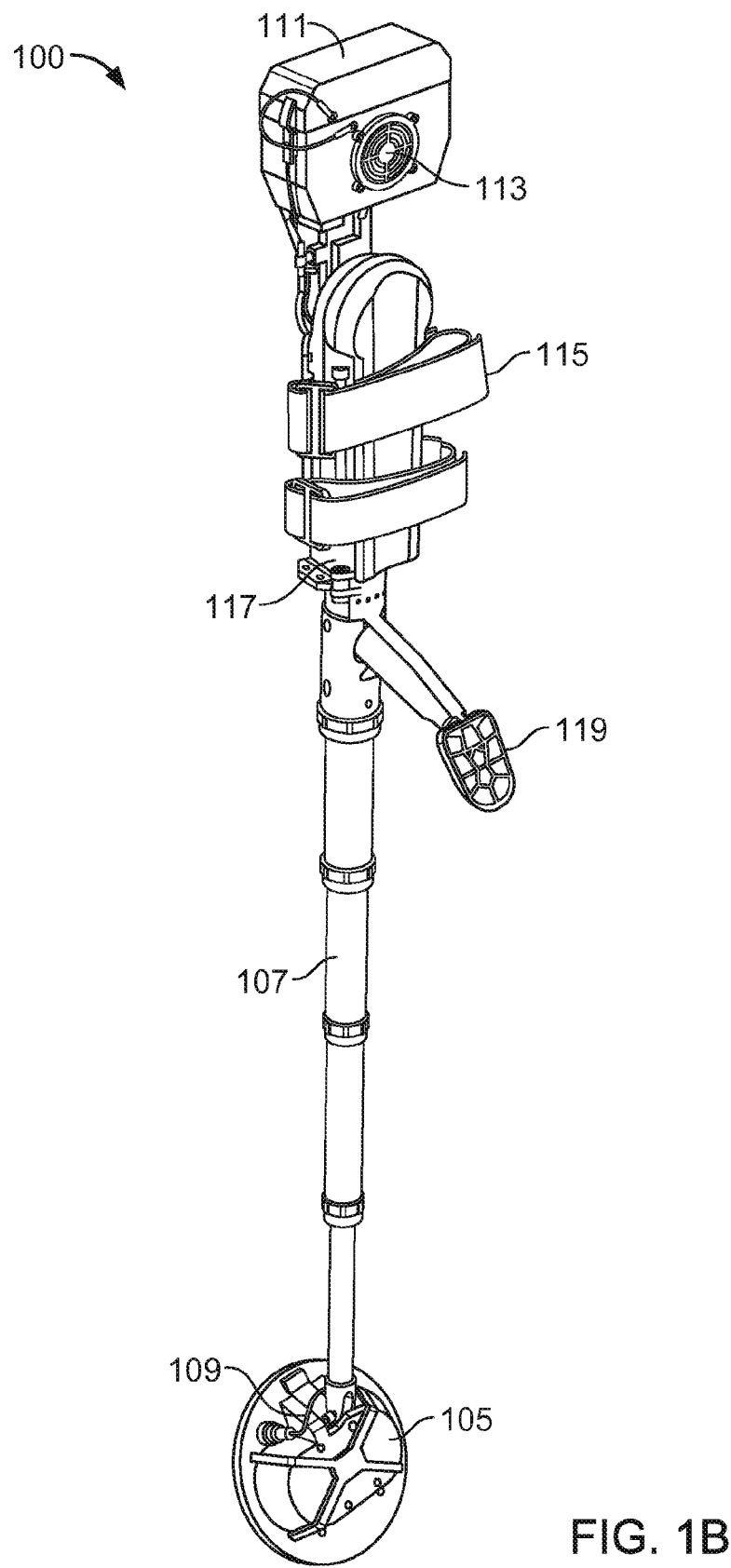

Referring to FIGS. 1A and 1B, the detection system 100 includes a sensor head 105 attached to a wand 107. A transceiver 127 (FIG. 1E) is included in the sensor head 105 such that the cabling that carries data to and from the sensor head 105 may be simplified. In this example, a cable 109 provides data communications between the sensor head 105 and electronics (not shown), such as an electronic storage and an electronic processor, included in a module 111 and/or an electronics housing 118 (FIGS. 1L and 1M). The module 111 also may include a speaker 113 or other output (such as a display, not shown) that provides an indication to an operator of the system 100 that a target has been detected.

The system 100 also includes a platform 115 that is sized to fit an arm of a human operator or a robotic system. The platform 115 opens on a bottom end 117 to a grip 119. The operator of the system 100 may control the motion and location of the sensor head 105 by grasping or otherwise contacting the grip 119 and moving the wand 107 through a range of motion. The platform 115 also forms a portion of an electronics housing 118.

Figure 1C:
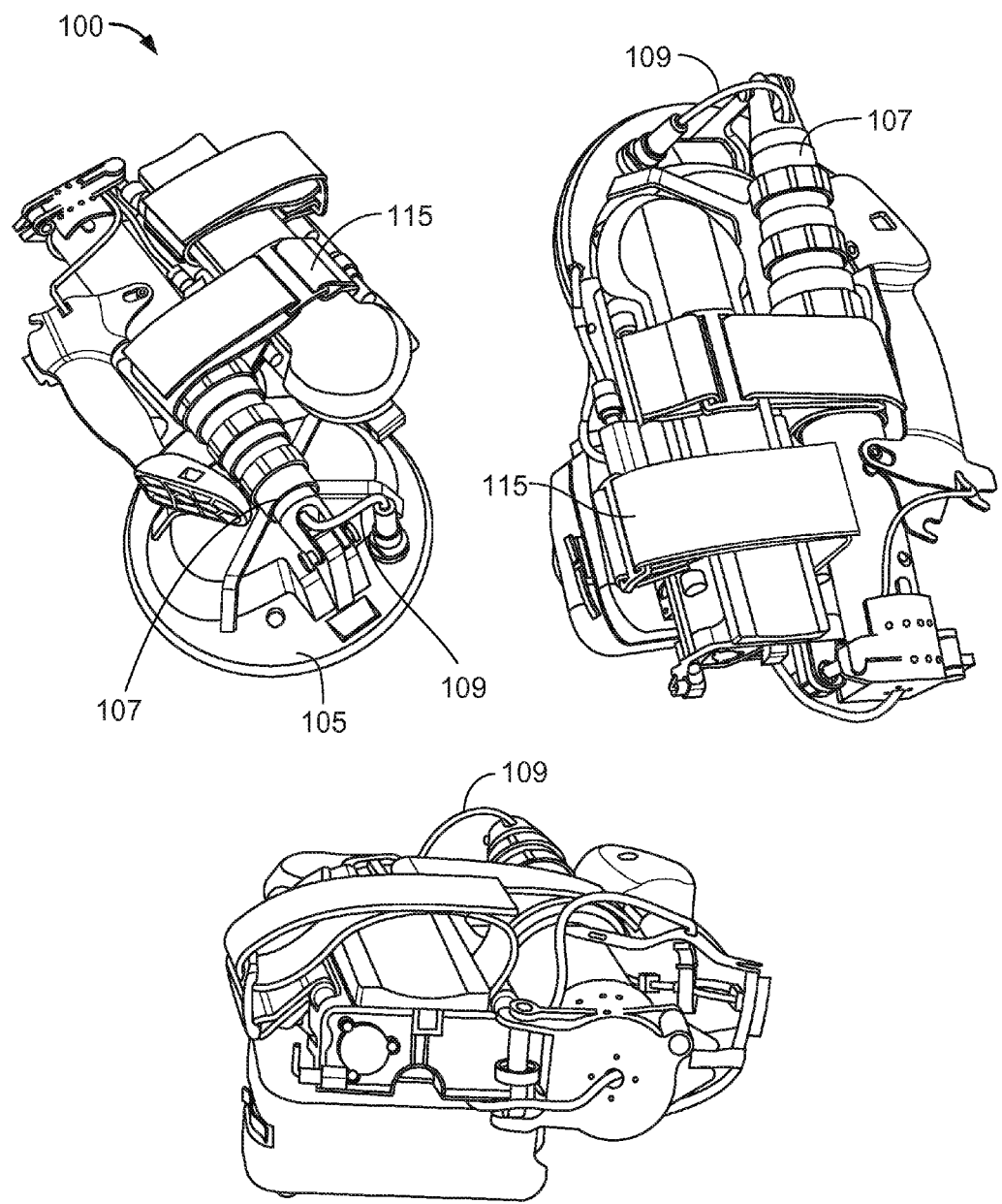
FIGS. 1C and 1D show views of the detection system when collapsed.
Figure 1D:
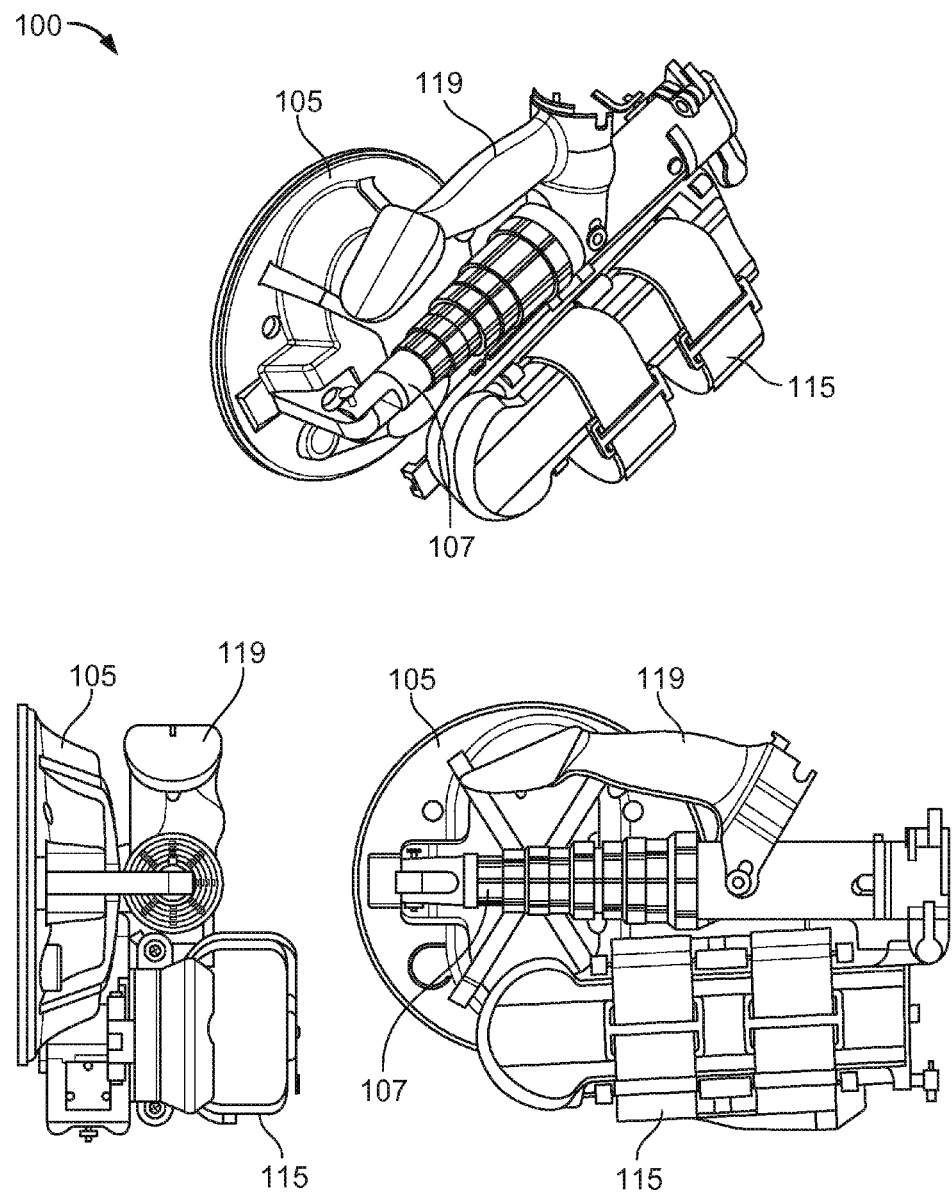

FIGS. 1C and 1D show views of the detection system 100 when the wand 107 is collapsed and the sensor head 105 is folded into the wand 107.

Figure 1E:
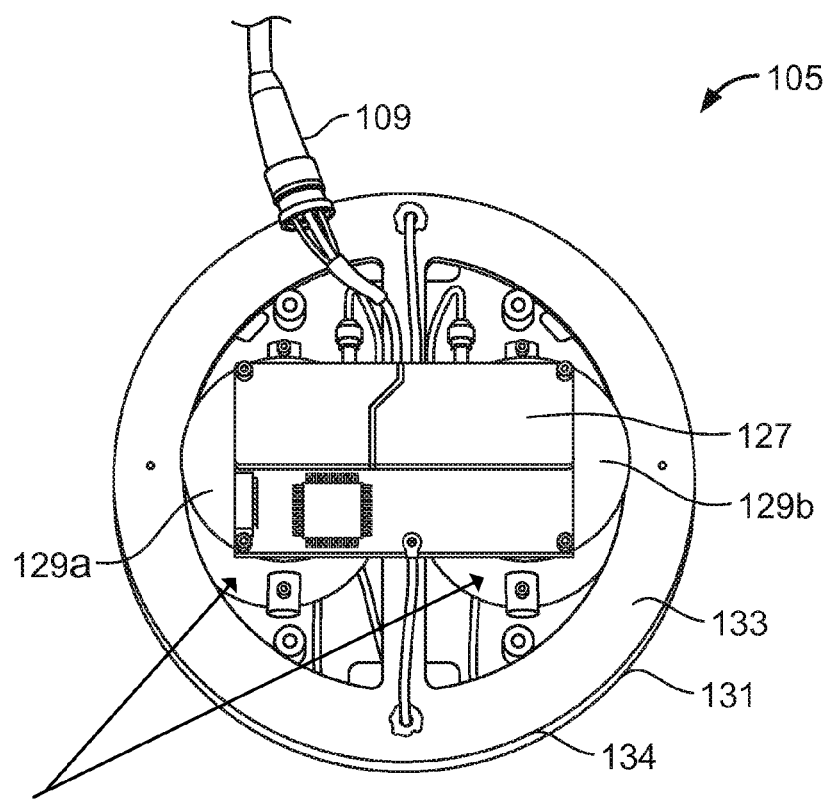
FIG. 1E shows a top view of a sensor head used in the detection system of FIGS. 1A-1D.
Figure 1F:
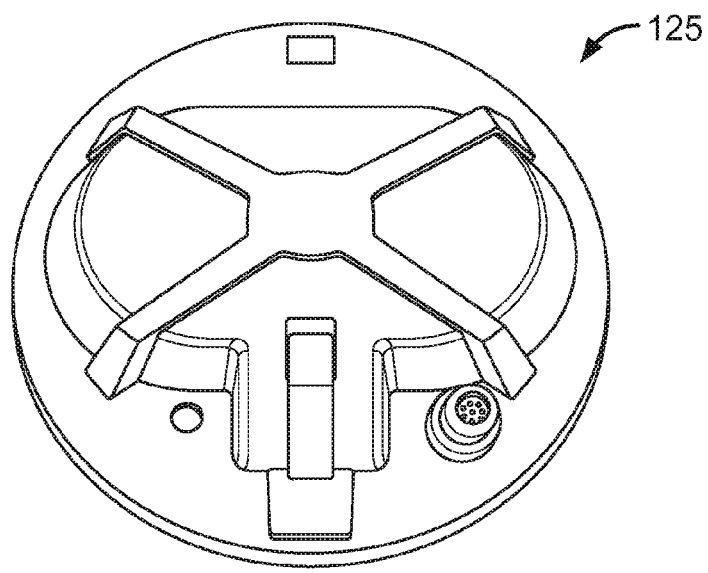
FIG. 1F shows a plan view of a cover for the sensor head of FIG. 1E.

FIG. 1E shows a top view of the components of the sensor head 105 without a cover 125 (FIG. 1F). The sensor head 105 includes a GPR 129, a transceiver 127, and a CWMD 133. The GPR 129 includes a receive antenna 129a and a transmit antenna 129b. The GPR 129 may be a stepped-frequency continuous-wave GPR (a GPR with a non-pulsed signal). The low-profile of a stepped-frequency continuous wave (SFCW) GPR antenna configuration allows a reduction in the overall height and contour of the sensor head 105, making collapse and visual registration with the ground easier for the user.

The GPR 129 includes a transmit antenna 129a and a receive antenna 129b. The transmit antenna 129a transmits electromagnetic signals in a particular frequency band, and the receive antenna 129b receives (detects or otherwise senses) signals from the surrounding environment that arise in response to being irradiated with the signals from the transmit antenna 129a. The frequency band of the GPR may be approximately 640 MHz to 4 GHz or any frequency band within that frequency range.

The transceiver 127 may be a radar transceiver. The transceiver 127 may allow for simplified cabling and the elimination of a microwave cable between the sensors (such as the GPR 129) in the sensor head 105 and electronics (such as electronics 135a and 135b shown in FIG. 1G) in a separate part of the detection system. For example, rather than using a coaxial cable or cables, the transceiver 127 allows for a cable such as the cable 109 (which may be a USB cable) that provides communication between the GPR and electronics that are removed from the sensor head 105. Elimination of the microwave cable may result in less power dissipation and reduction in phase mismatch of the signals traveling in the microwave cable.

The sensor head 105 may operate in multiple modes, and a particular operating mode may be selected by the operator of the system 100 through the transceiver 127. The transceiver 127 may include a field-programmable gate array (FPGA) or other processor that allows selection from among multiple operating modes of the sensor head 105 or allows for programming of the FPGA. In some implementations, the user may manually select between the various operating modes. For example, the user may select an operating mode using an input/output device that is in communication with the transceiver 127. In some implementations, the operating mode may be selected beforehand.

The operating mode selectable through the transceiver 127 may be a mode that determines operating characteristics of the sensor, or sensors, included in the sensor head 105. For example, each of the operating modes of the GPR 129 may be associated with a different frequency band. A first operating mode may be an operating mode in which the GPR transmits signals in a frequency band from about 640 MHz to 3.4 GHZ, in steps of 20 MHz. Such an operating mode may be used in situations in which relatively deep penetration of the GPR signals is desired (such as when targets are buried deep in the ground) and when greater resolution of certain signal processing features (such as a mapping of the ground-air interface is desired). Another mode may be an operating mode in which the GPR 129 operates by transmitting signals in a frequency band from 1.3 GHz to 2.7 GHz in steps of 10 MHz. Such an operating mode has a frequency band approximately half as wide as the first mode. This operating mode may be used to, for example, reduce power consumption or to provide more energy (more signals) at a known frequency of interest or more energy in a frequency band of interest.

Although two modes are discussed above, the transceiver 127 may allow selection from among more than two operating modes. For example, a mode of operation may be a mode in which the GPR 129 switches among multiple operating modes in a predetermined, pseudo random, or random manner. In some implementations, the transceiver 127 may allow selection of a mode based on environmental conditions.

Referring also to FIG. 1F, a top view of a cover 125 for the sensor head 105 is shown. The cover 125 may fit over the components of the sensor head 105 to protect the components. The cover 125 may attach to the wand 107. The cover 125 also may attach to the sensor head 105. The sensor head 105 may be operated without the cover 125 present.

The sensor head 105 also includes a CWMD 133 that includes an upper coil 134 and a lower coil 131. The upper coil 134 may be a coil that transmits an electromagnetic field and the lower coil 131 may detect an electromagnetic field generated by currents induced in an object in response to being irradiated by the transmitted electromagnetic field. In some implementations, the coil 134 is the coil that detects the EM field and the coil 131 is the coil that transmits the EM field. The CWMD 133 may be placed at or near an outer edge or portion of the sensor head 105.

In greater detail, the CWMD 133 produces or transmits an electromagnetic (EM) field at multiple frequencies through the transmit coil 134, and the produced EM field induces a current in metallic portions of items in the vicinity of the CWMD 133. The current induced in the metallic portions of the items produces a second EM field that is sensed by a receive coil 131 of the CWMD 133. The second EM field sensed by the CWMD 133 is analyzed to further characterize the item. For example, the analysis may distinguish an item that is a target from an item that is a clutter object or part of the background.

The transmit coil 134 of the CWMD 133 produces EM radiation at a number of frequencies, and the number of frequencies is sufficient to allow determination of a signature of an item that is independent of the item's orientation relative to the transmit and receive coils 134, 131 of the CWMD 133. The CWMD 133 may have more than six separate and distinct frequencies, or the CWMD 133 may have twenty-one or more separate and distinct frequencies.

The CWMD 133 senses quadrature and in-phase (I&Q) data that represents the second EM field. As discussed with respect to FIGS. 2-4, sensing I&Q data at multiple frequencies allows determination of a signature of the target that is independent of the orientation and/or position of the target relative to the sensor. Thus, the signature of the target is the same, or substantially the same, for the target regardless of the position or orientation of the target relative to the sensor. The signature may allow improved detection of targets and/or improved discrimination between targets and clutter. For example, employing the signature may result in accurate detection of landmines and other hazardous objects that are buried more than 1-foot (for example, 21-inches) below the surface of the ground.

Figure 1G:
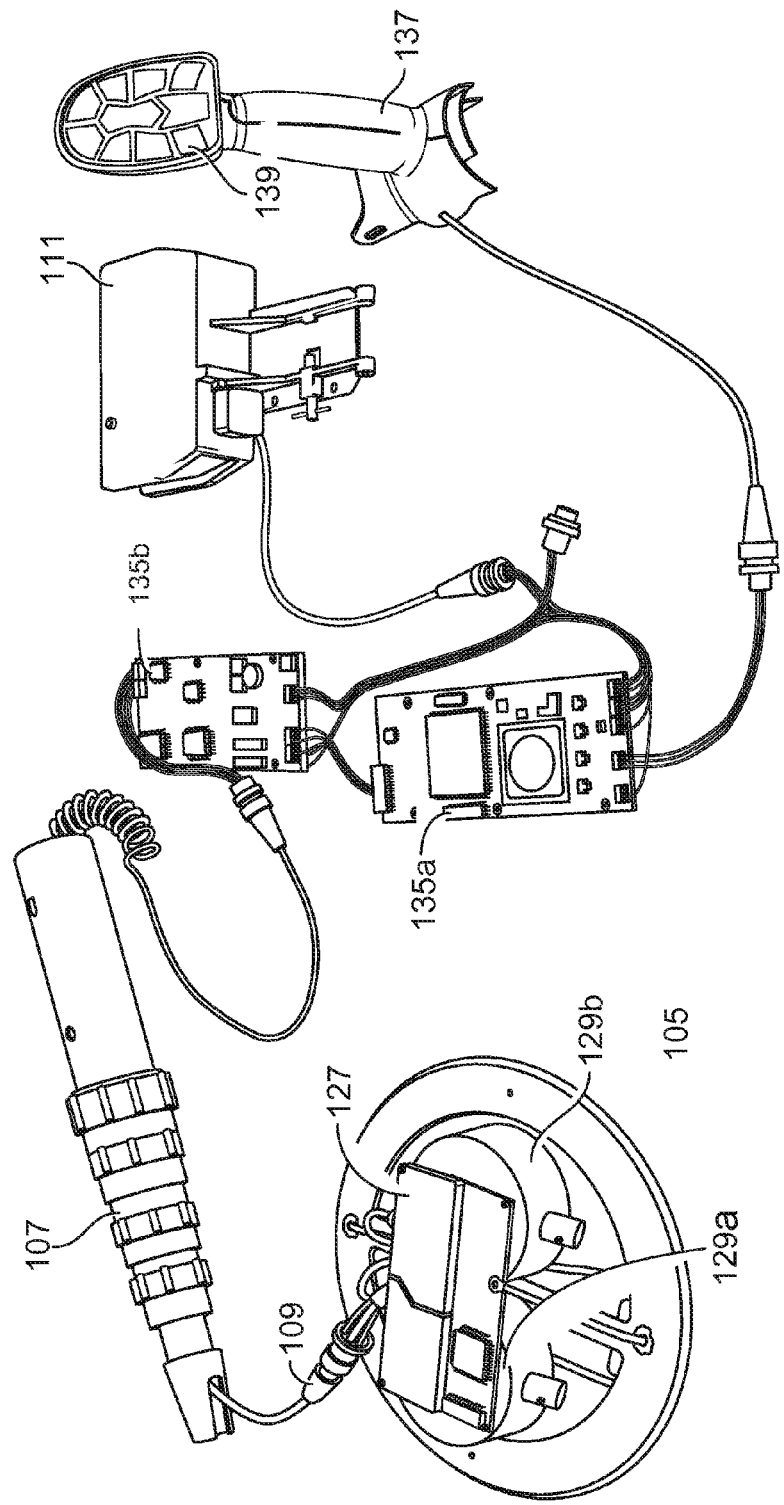
FIG. 1G shows views of internal components of the detection system of FIGS. 1A and 1B.

FIG. 1G shows internal components of the detection system 100 of FIGS. 1A and 1B. The detection system 100 includes the sensor head 105, the cable 109, the wand 107 (shown in a collapsed state in FIG. 1G), electronics 135a and 135b, module 111, and a hand control 137. The electronics 135a and 135b may, for example, include one or more processors and electronic storage modules that process data from the GPR 129 and/or the transceiver 127. The electronics 135a and 135b also may process data from a CWMD and other sensors that may be included in the sensor head 105. The electronics 135a and 135b may be included in the housing 118.

The hand control 137 (similar to the hand control 119 shown in FIG. 1A) provides the operator of the system with control over the position of the sensor head 105. Additionally, the hand control 137 includes an interface 139 that allows the user to program the transceiver 127 and/or select an operating mode for the GPR 129. The hand control 137 also may allow the user to set various system parameters, such as the volume or tone of a sound that alerts the user to a potential detection.

Figure 1H:
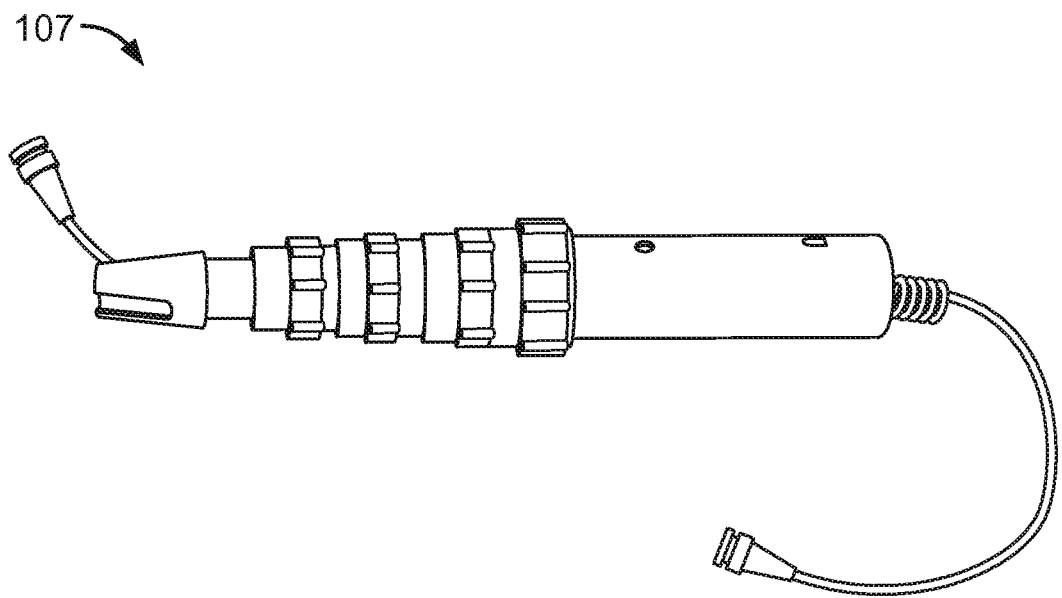
FIG. 1H shows a view of a wand of the detection system of FIGS. 1A and 1B in a collapsed state.
Figure 1I:
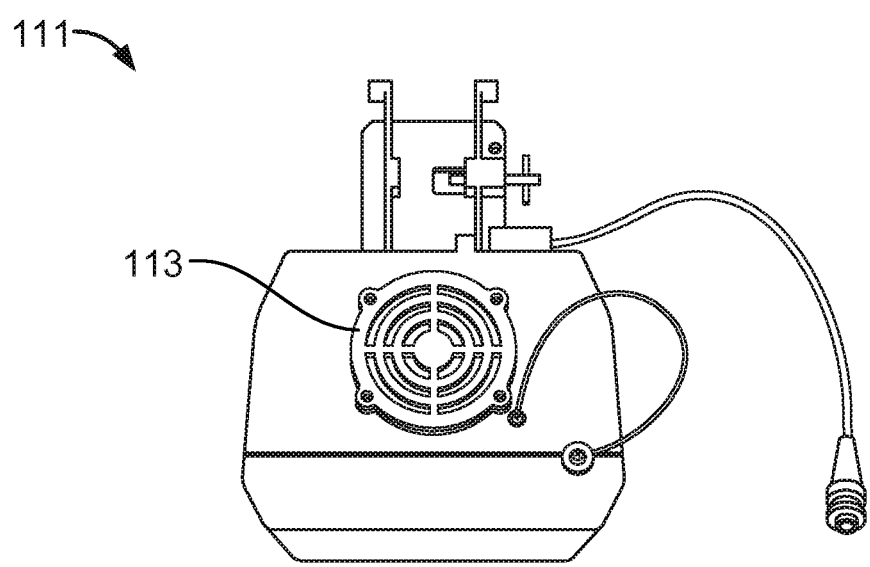
FIG. 1I shows a view of an audio speaker that may be included in the detection system of FIGS. 1A and 1B.

FIG. 1H shows a plan view of the wand 107 in a collapsed state, and FIG. 1I shows a plan view of the module 111. The module 111 includes a speaker 113 and provides an audio interface to the operator. A headphone set (not shown) that connects to the module 111 and the speaker 113 may be included and may be used while operating the system 100 in, for example, demining operations, along with ancillary hardware. The speaker 113 and electronics associated with the speaker 113 support generation of constant and sweeping tones. For example, tones from a sensor (such as the CWMD 133 or GPR 129) may provide a tone "flip" or other audible indicator when passing over a target or in response to an item being in the vicinity of the sensor head 105. The module 111 and speaker 113 also supports more complex audio such as human voice. For example, voice outputs and other relatively complex tones may be recorded and stored for playback. The system 100 may include multiple operating modes with the recorded models for different targets (for example, mines as compared to improvised explosive devices (IEDs)).

The audio output may be one of three different types: (1) MD output, (2) GPR output or (3) system status output. The MD response sound may be a set of variable pitch and amplitude audio tones, while the GPR sounds may be discrete, wideband beeps. Other audio responses may be either distinct electronic tones or commands that are generated to inform the operator of system status through audible indicators alone. For example, a Battery Low Warning command may be generated within five minutes of battery life remaining. All (built-in test) BIT Failure debug codes may be in spoken English. Examples of built-in tests include tests that run, continuously or periodically, to determine whether the GPR and CWMD are functioning properly or at all. When the GPR or CWMD are not operating properly, the BIT may produce an indicator to the operator of the system 100 such that the operator stops using the system 100 and/or repairs the system 100.

The system 100 stores the default audio mode and automatic target recognition (ATR) models in non-volatile memory enabling the system to remember the states even upon system shut down.

A battery (not shown) may be mounted directly to the rear of the module 111, or the system 100 may be powered by a battery that is external to the system 100. For example, an external battery may be mounted to a belt to form a belt-mounted battery configuration worn by an operator of the system 100. The belt-mounted battery configuration may be worn by an operator of the system 100, and the battery may be coupled to the module 111 (or another part of the system 100) to provide power to the system 100. A variety of battery types may be employed in the system, for example, a variety of military batteries may be employed.

An electronic processor included in or on the system 100 (such as in the electronics housing 118) or in communication with the system 100, may be accessed through a USB connection. For example, the electronic processor may be accessed at an external battery pack connector interface. This may add flexibility to the system 100. For example, the electronic processor may be programmed, reprogrammed, and selectable to address specific mine targets (or other specific types of hazardous objects of interest) and to address a specific region of operations via web access.

Figure 1J:
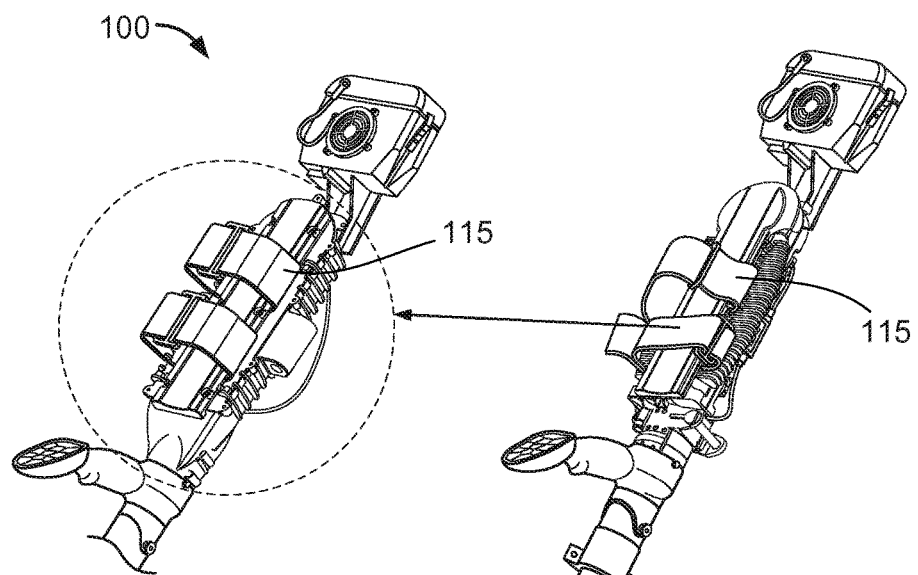
FIG. 1J shows a view of the system of FIG. 1A in an extended state.
Figure 1K:
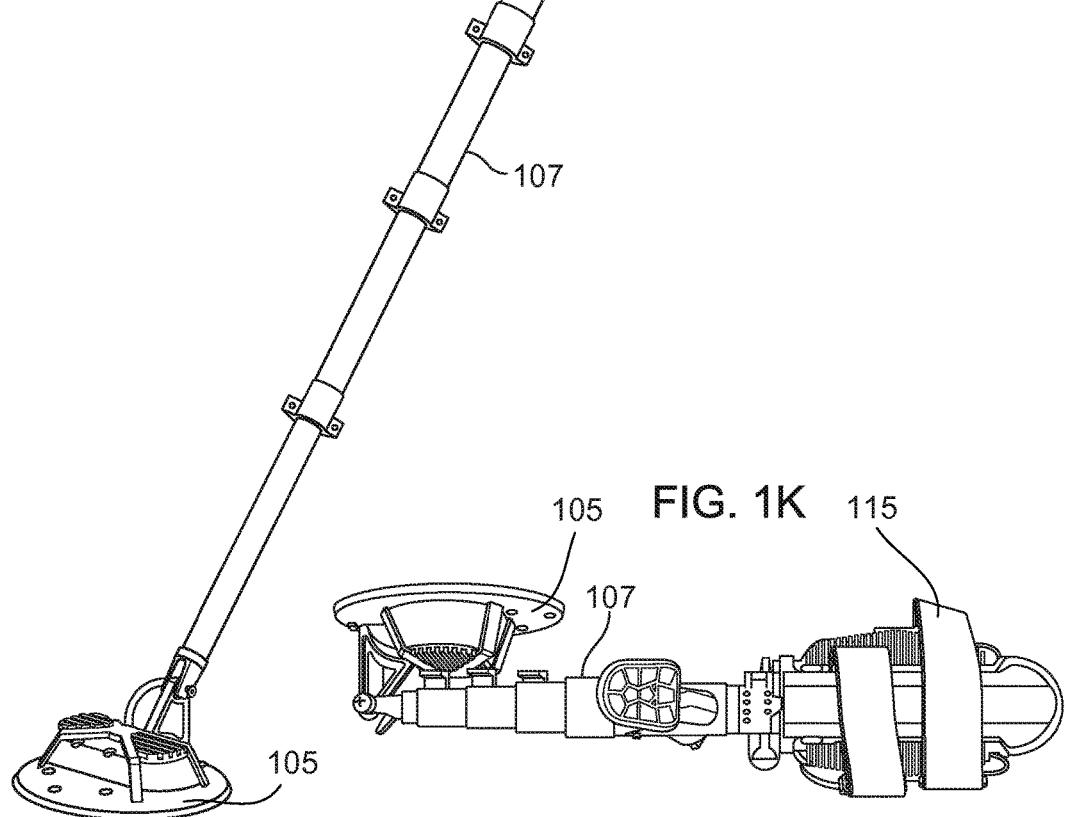
FIG. 1K shows a view of the system of FIG. 1A in a collapsed state.
Figure 1L:
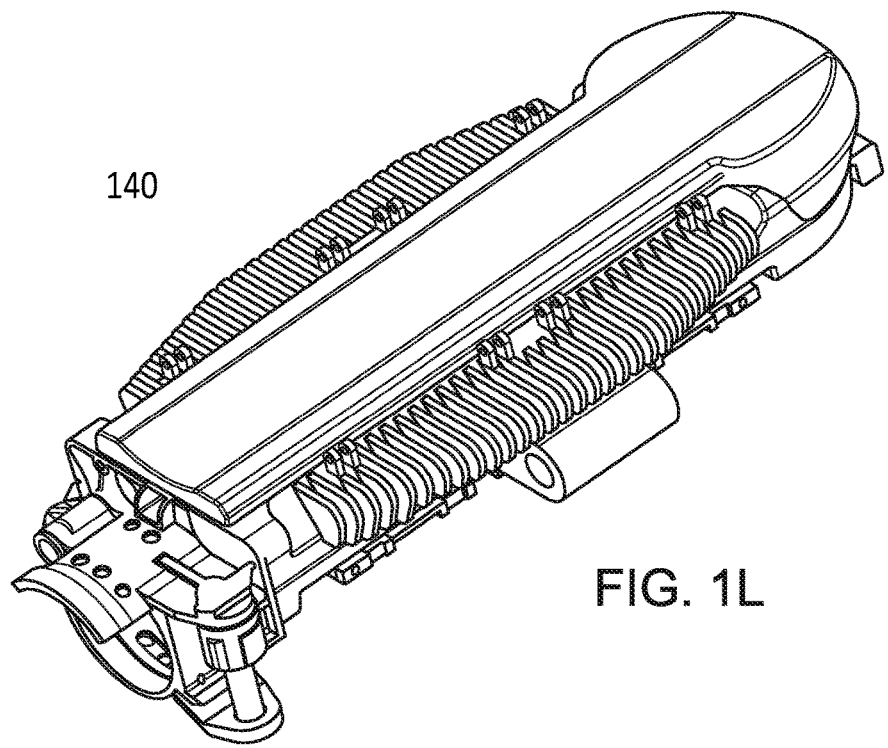
FIGS. 1L and 1M show a housing used in the system of FIG. 1A.
Figure 1M:
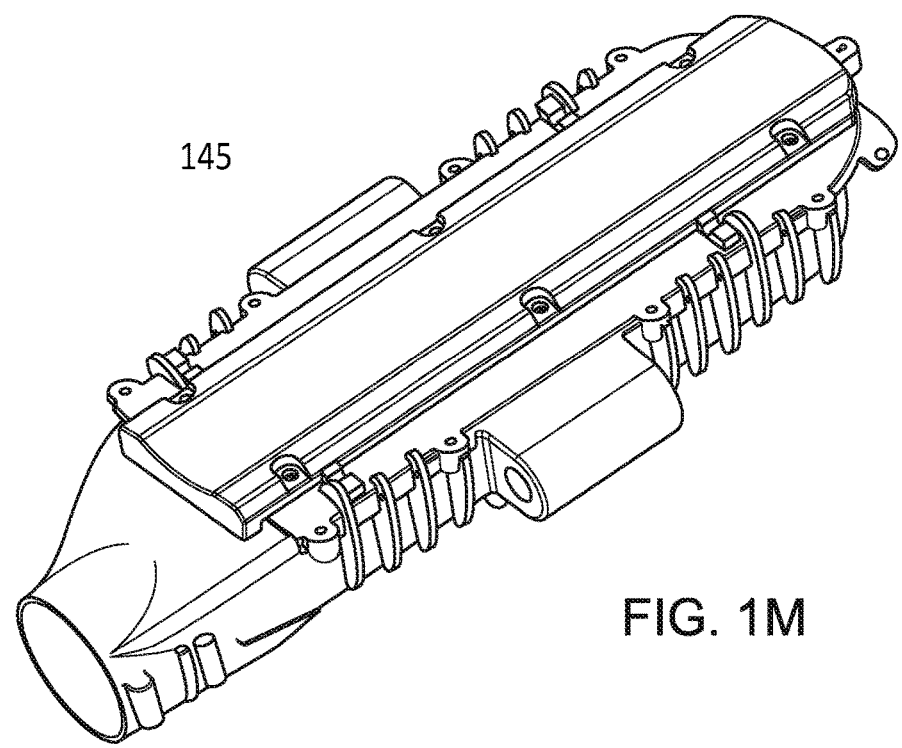

FIG. 1J shows another plan view of the system 100 with the wand 107 extended, and FIG. 1K shows another plan view of the system 100 with the wand 107 collapsed and the sensor head 105 folded (or collapsed) against the wand 107 to reduce the size of the collapsed system 100.

FIG. 1L shows a glued carbon fiber housing 140, and FIG. 1M shows an aluminum housing 145. The housings 140, 145 may be the electronics housing 118. The housings 140, 145 may house the electronics for the sensor head 105. The aluminum housing 145 allows dissipation of heat generated by the electronics housed by the housing 145. Any thermally conductive, lightweight material may be used to construct the housing 145. The housing 145 may be a two-piece housing that is sized to fit about the wand 107.

Figure 1N:
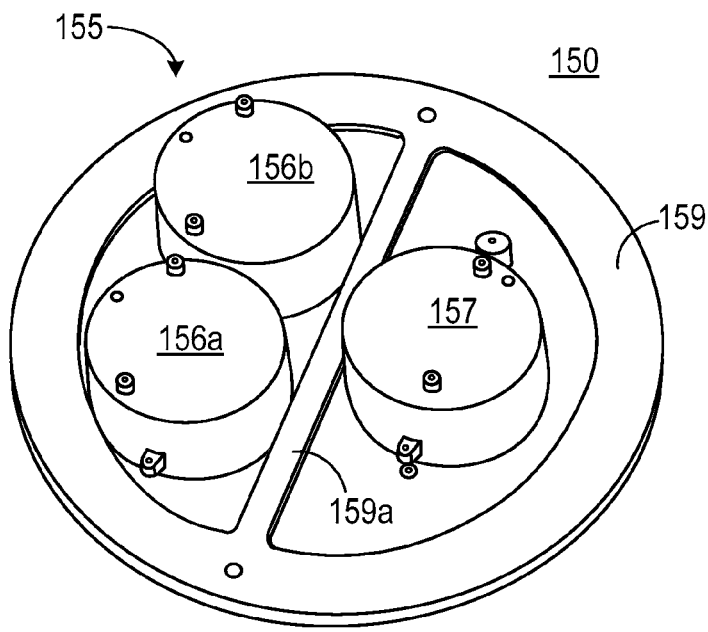
FIG. 1N shows a plan view of another example sensor head.
Figure 1O:
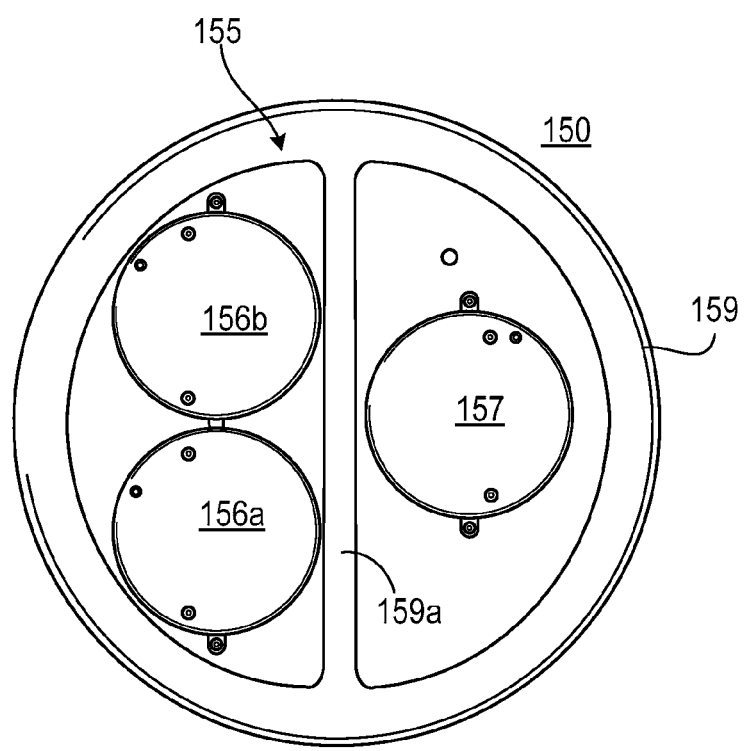
FIG. 1O shows a top view of the sensor head of FIG. 1N.

FIG. 1N shows a plan view of internal components of another example sensor head 150, and FIG. 1O shows a top view of the internal components of the sensor head 150. The sensor head 150 includes a GPR 155 and a CWMD 159. In some implementations, the sensor head 150 may include a transceiver (not shown) similar to the transceiver 127. The transceiver is in communication with the GPR 155. The transceiver may be located in the sensor head 150 (similar to the implementation shown in FIG. 1E), or the transceiver may be located outside of the sensor head 150. The sensor head 150 also includes cabling, electronics, and a rim to attach a cover similar to those discussed with respect to the sensor head 105. The sensor head 150 may be mounted on a wand such as the wand 107.

The sensor head 150 is similar to the sensor head 105, except the GPR 155 included in the sensor head 150 has two receive antennas, 156a and 156b and one transmit antenna 157. The inclusion of more than one receive antenna may improve performance by providing more samples of a region scanned by the sensor head 150. A portion 159a of the CWMD 159 passes between the two receive antennas 156a, 156b and the transmit antenna 157.

Although in the example of FIGS. 1N and 1O, the sensor head 150 includes two receive antennas 156a, 156b and one transmit antenna 157, this is not necessarily the case. The sensor head 150 may include more than two receive antennas, and each may be similar to the receive antennas 156a, 156b, and the sensor head 150 may include multiple transmit antennas, each of which may be similar to the transmit antenna 157.

As discussed above, the system 100 provides a lightweight and portable sensor head. In addition to the various features discussed above, the system 100 also may include one or more electronic processors configured to process data collected by the sensors included in the sensor head 105 and the sensor head 150. Data processing techniques are discussed below, and these techniques may be applied to data collected by the sensors in the sensor head 105 and the sensor head 150. The data processing techniques discussed below also may be applied to data collected by other sensors. Further, the data processing techniques discussed below also may be applied to data as it is collected by a sensor (and may be stored temporarily in a buffer) or to data that was previously collected and stored in an electronic storage.

The system 100 includes several mechanical aspects. For example, the system 100 may be sealed against water and dust. The system 100 may include maintainability improvements that include using an aluminum piece electronics housing (such as the housing 145 of FIG. 1M) in place of carbon fiber (such as the housing 140 of FIG. 1L). A carbon fiber housing may be more challenging to fit than Referring to FIG. 2, a process 200 for determining a signature of an object is shown. The process 200 may be performed by one or more electronic processors associated with a sensor head such as the sensor head 105, the system 100, and/or the sensor head 150. The processor may be integrated with the sensor head or the sensor head may be separate and removed from the processor. In examples in which the sensor head is separate from the processor, the processor and the sensor head may be in communication while the sensor head is operating such that the processor receives data from the sensor head and analyzes the data as the sensor head operates. In the example discussed below, the sensor head is or includes a metal detector capable of sensing quadrature and in-phase data, such as the CWMD 133 or the CWMD 159. However, in other examples, the sensor head may include a different or additional sensor.

A first magnetic field is produced in the vicinity of an object (210). The object has an orientation relative to a direction of propagation of the first magnetic field and the first magnetic field induces a current in the object. Quadrature and in-phase data representing the second magnetic field is sensed as a current arising in a coil of the sensor (220). The sensed data is fit to a two-dimensional signature (230). The two-dimensional signature may be a signature that represents the quadrature data as a function of the in-phase data.

A template of data that is independent of the orientation of the object relative to the first magnetic field is generated (240). The template of data also may be independent of an orientation of the object relative to a direction of propagation of radiation produced by the sensor and directed toward the target. The template of data may be a template that represents a three-dimensional object associated with a two-dimensional signature that matches, or closely matches, the two-dimensional signature found in (230). The three-dimensional object may be found from among multiple candidate three-dimensional objects by iterating through the potential three-dimensional space of I & Q data that could project into the two-dimensional signature found in (230). The number of candidate objects may be reduced by removing non-logical values (non-positive values) until the iteration converges to a unique candidate three-dimensional model that projects the two-dimensional I & Q signature found in (230) in real (positive) values.

In the model, the shape and material of each of the metallic objects is described using vectors representing amplitude and frequency, where frequency is the relaxation rate of the signature measured after being influenced by the electromagnetic field produced by the sensor. Because the three-dimensional model is a close approximation to the detected object, the orientation of the detected object relative to the sensor may be accounted for, and the vectors are independent of the relative orientation of the detected object and the sensor.

A feature of the object is extracted from the three-dimensional template (250). The feature of the object is extracted from data that is derived from, or produced by, the three-dimensional template, such as the amplitude and frequency vectors discussed above.

Extracting a feature of the object may include determining an amplitude of the second magnetic field and determining a frequency of the second magnetic field or the relaxation rate of the detected object after being influenced by the electromagnetic field produced by the sensor. Extracting a feature of the object may include identifying, from the frequency vector, a first frequency value and a second frequency value. Extracting a feature of the object may include identifying, from the amplitude vector, a first amplitude value and a second amplitude value. In some examples, the feature may include a ratio of the first frequency value and the second frequency value and a ratio of the first amplitude value and the second amplitude value. Using the ratio instead of the raw frequency and amplitude values as the extracted feature values may remove noise from the value of the feature, particularly if the noise is common to all frequency values and/or all amplitude values. The first and second frequency values may be the two highest frequency values, and the first and second amplitude values may be the two highest amplitude values. The first and second amplitudes may be the amplitudes respectively associated with the first and second frequencies.

In some examples, a distance between the detected object and the sensor may be estimated. The estimated distance between the detected object and the sensor may be used to normalize the data collected by the sensor to a constant, arbitrary distance before extracting the feature values of the amplitude and frequency. Determining the distance between the detected object and the sensor allows the extraction and/or use of additional features. For example, the distance itself may be used as a feature.

Whether the object is an object of interest is determined based on the extracted features (260). To determine whether the object is an object of interest, the extracted feature values may be input into one or more classifiers that are configured to produce a confidence value that may assume a range of numerical values, each of which indicates whether the object is more likely to be a target object or a clutter object. In some examples, the classifier is configured to produce a confidence value that is one of a discrete number of numerical values, each of which indicate whether the object is an object of interest (a target) or an object not of interest (clutter).

Figure 2:
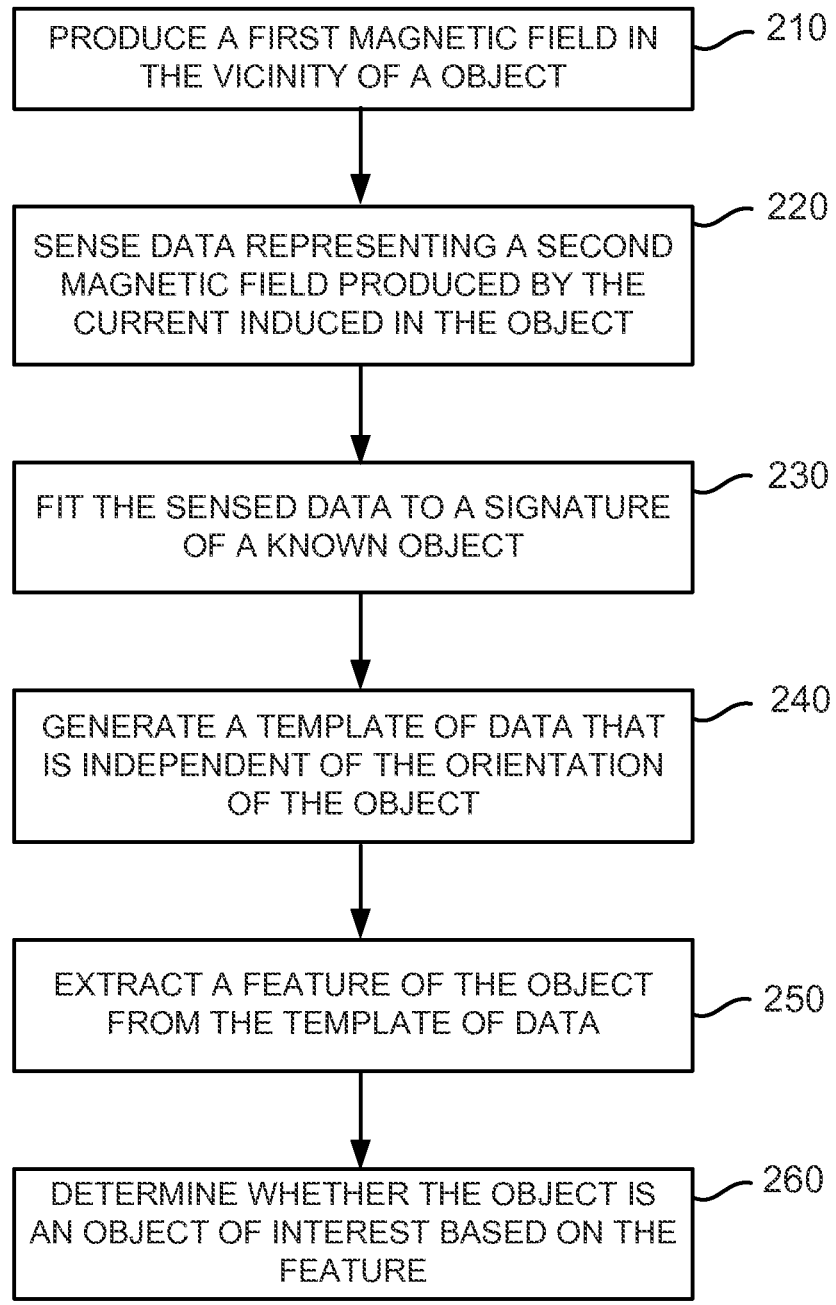
FIG. 2 is an example process for determining a signature of an object.

Although in the example process 200 discussed with respect to FIG. 2, the process includes determining the template of data that is independent of orientation (such as the three-dimensional object), this is not necessarily the case. In some implementations, data produced by the three-dimensional object is received by the processor from a pre-generated or separately generated template of data.

Figure 3:
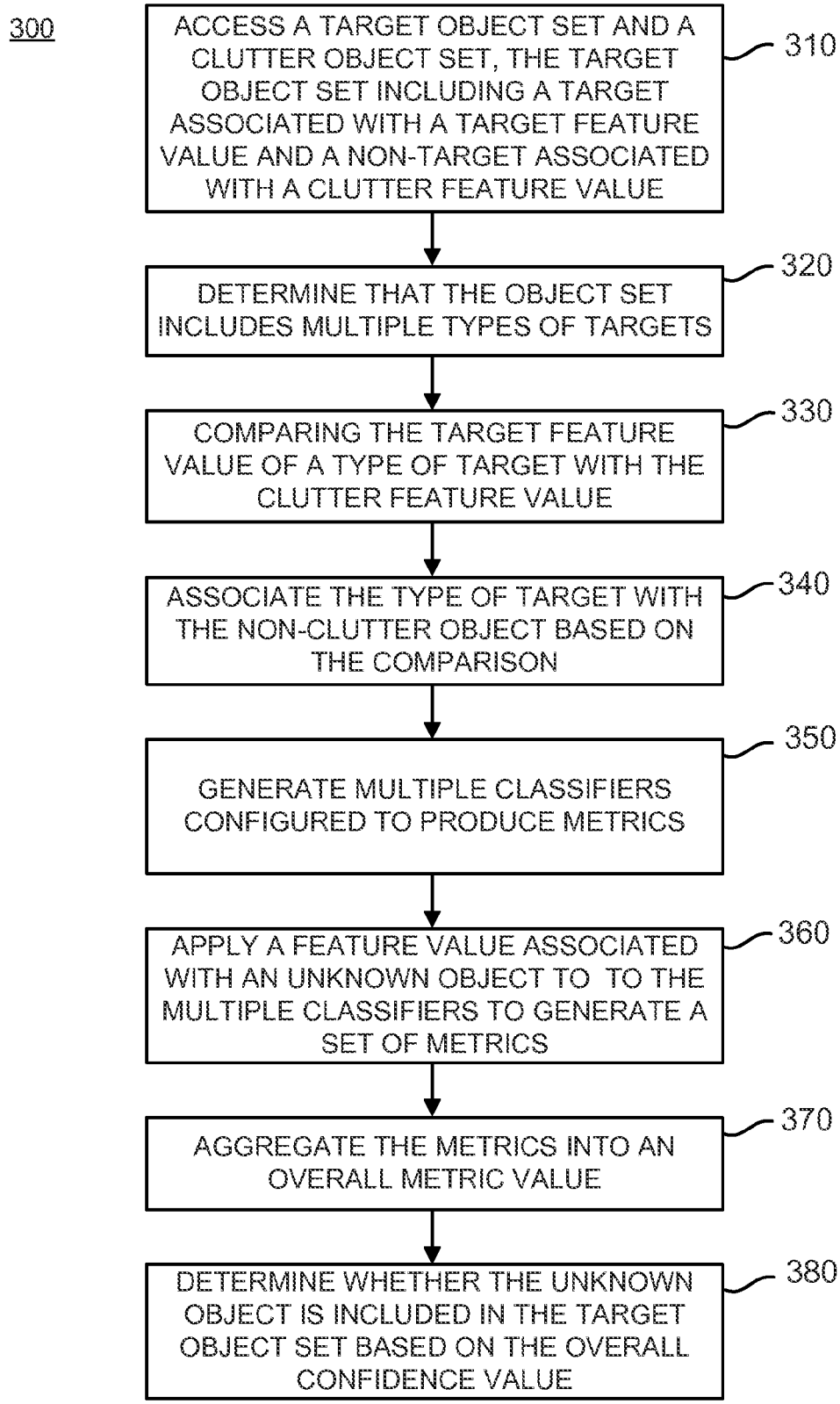
FIG. 3 is an example process for discriminating among objects.

Referring to FIG. 3, an example process 300 for discriminating among objects is shown. The process 300 may be performed using data produced by the process 300 discussed with respect to FIG. 2. The process 300 may be performed by a processor integrated with a sensor head such as a sensor in the sensor head 105 or the processor may be separate from the sensor head. In examples in which the sensor head is separate from the processor, the processor and the sensor head may be in communication while the sensor head is operating such that the processor receives data from the sensor head, discriminates, and classifies the data detected by the sensor head as the sensor head operates.

In the discussion below, multiple classifiers are trained using data that is known to be associated with targets and data that is known to be associated with clutter. The training set includes multiple and distinct types of targets and/or multiple and distinct types of clutter. Each target type is paired, or grouped, with the type, or types, of clutters that are most closely associated with the target type. The grouped data is used to train a particular classifier. As a result, this classifier is tuned for the target-clutter pairing, or grouping, such that the classifier produces a metric or confidence value indicating that an object that has a feature similar to that of the targets in the target set is likely, or very likely, to be a target object. The other multiple classifiers are similarly trained using other clutter-target groupings or paring. Once trained, each of the classifiers produce, in response to an input representing a value associated with an object of unknown classification, a metric or confidence value that indicates whether the unknown object is more likely to be clutter or more likely to be a target. The metric of all of the classifiers may be aggregated to produce an overall metric for the unknown object. The overall confidence may produce a more accurate determination of whether the unknown object is a target as compared to using a single classifier.

In greater detail, a target object set and a clutter object set are accessed (310). The target object set includes a target that is associated with a target feature value and a non-target that is associated with a clutter feature value. For example, the target and clutter feature values may be a ratio of the frequency of relaxation of a metallic object detected by a CWMD sensor.

Whether the object set includes multiple types of targets is determined (320). The target object set may include multiple and distinct types of targets (such as different types of landmines, different types of trace chemicals used in the production of explosives, or different types of metallic pins used to ignite an incendiary device). Similarly, the clutter object set may include multiple and distinct types of clutter (such as different types of soils in which landmines are buried, different innocuous solids or liquids on which trace chemicals reside, or different types of foot wear in which incendiary devices are embedded). Continuing with the example in which a CWMD sensor is used for landmine detection, the sensor may encounter multiple different types of landmines, each having a different shape, size, and/or metal content, buried within different types of soils.

Figure 4:
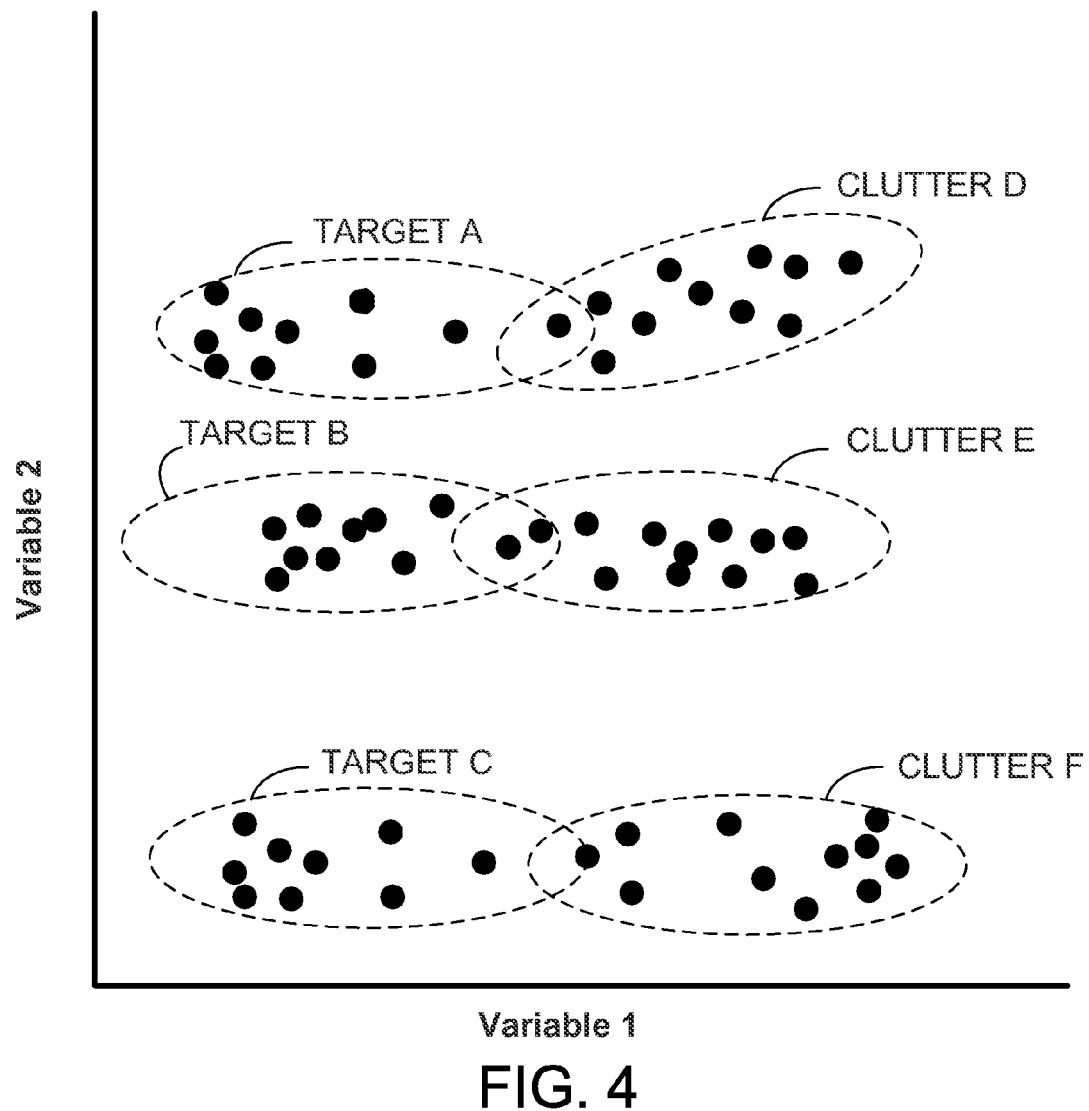
FIG. 4 is a scatter plot illustrating example feature values for multiple types of clutter and targets.

Referring also to FIG. 4, a scatter plot illustrating example feature values for target sets "A," "B," and "C" and clutter sets "E," "F," and "G" is shown. To create the scatter plot shown in FIG. 4, feature values associated with each of the targets in the three target sets and feature values associated with each of the clutter objects in the three clutter sets are plotted on a two-dimensional graph. In this example, there are three different target sets and three different clutter sets. In other examples, there may be more or fewer clutter and/or target sets, and the number of clutter sets and target sets is not necessarily the same. A target set (or clutter set) may be considered distinct from another target set (or clutter set) if the two sets do not overlap in feature space (such as the feature space shown in FIG. 4), or are less than a threshold distance apart. In the example of FIG. 4, "target A" and "target B" are considered to be distinct target types.

If the target set includes one type of target and the clutter set includes one type of clutter, the process 300 terminates.

A target feature value is compared to a clutter feature value (330). The types of targets and clutters that are closest to each other in the feature space represented in the scatter plot 400 are grouped or paired together. The targets and clutter may be grouped, paired, or otherwise compared using, for example, a nearest-neighbor analysis such that a particular type of target is paired with the clutter that is nearest in feature space. In another example, all target types are grouped with all clutter types that fall within a certain distance of each other in feature space. Regardless of how the target types are grouped with the clutter types, one target type may be associated with one clutter type or multiple target types may be associated with a lesser number of clutter types (or vice versa).

The type of target is associated with the type of clutter based on the comparison (340). As discussed above, the association may be made based on the closeness of the target type and clutter type in feature space. Referring again to FIG. 4, "target A" is associated, or paired, with "clutter D", "target B" is associated with "clutter E", and "target C" is associated with "clutter F." Although in the example shown in FIG. 4, the paired targets and clutters overlap in feature space, this is not necessarily the case. In some examples, the paired targets and clutters may be close in feature space but not necessarily overlapping. For example, clutters and targets may be paired based on being the target and clutter that are closest to each other as compared to all other possible target and clutter pairings or groupings. Closeness in feature space may be determined by a distance metric such as, for example, a Mahalanobis distance, a linear distance metric, or a nearest neighbor analysis.

Multiple classifiers are generated (350). Each of the multiple classifiers is trained using a particular target-clutter grouping or pairing. The generated multiple classifiers may include various types of classifiers. For example, the multiple types of classifiers may include a multi-layer perceptron (MLP), a Bayesian classifier, radial basis function, Kohonen self-organizing map, a simplified fuzzy ARTMAP, and/or support vector machine (SVM).

Returning to the example of FIG. 3, "target A" and "clutter D" are used to train and generate a first classifier, "target B" and "clutter E" are used to train and generate a second classifier, and "target C" and "clutter F" are used to train and generate a third classifier. Thus, each of the generated classifiers is tuned to a particular target-clutter grouping or pairing. The classifiers each produce a confidence value or metric that indicates whether an unknown object is a target or a clutter based on a feature of the unknown object being input into the classifier. For example, the classifier that is trained on "target A" and "clutter D" data may produce a confidence of "1" (or 100%) when an unknown object having features similar to those in the "target A" set is received, indicating that the unknown object is a target. This same classifier may produce a confidence of "0.5" when an unknown object having a feature similar to that of a target in "target C" is received, indicating that the classifier has made a neutral decision as to whether the unknown object is a target. By individually training the classifiers in this manner, each of the classifiers is able to distinguish between clutters and targets that are very close in feature space. Due to their similarities, such targets and clutters may be difficult to distinguish using ordinary training techniques that do not segment the training data of clutter and/or targets into distinct types.

The trained classifiers are used to determine whether an unknown object is more likely to be a target or more likely to be clutter.

A feature value associated with an unknown object (an object that the classifiers have not encountered previously) is input to the multiple classifiers (360). The feature value may be, for example, a ratio of vector frequencies and amplitudes as discussed above. Each of the multiple classifiers into which the feature is input produce a metric that indicates how likely it is that the unknown object is a target.

The metrics from the multiple classifiers are aggregated into an overall metric (370). The overall metric may produce improved results as compared to techniques that determine whether an object is a target using a single classifier. The metrics may be aggregated by, for example, summing the metrics produced by each of the multiple classifiers. For example, the unknown object may be a target that is associated with a feature value similar to those of the targets in "target B." Thus, the first classifier (trained using "target A" and "clutter D") and the third classifier (trained using "target C" and "clutter F") may produce a metric that indicates that the classifier is neutral as to whether the target is a clutter or a target. The neutral metric may be "0.5" on a scale of 0 to 1. In contrast, the second classifier (trained using "target B" and "clutter E") may produce a metric that is very close to "1," indicating that the unknown object has a high likelihood of being a target. Thus, in this example, the aggregated metric is the summation of the three metrics, and is "2." An unknown object having characteristics of "clutter E" would have an aggregated metric of "1" because the second classifier would produce a metric of "0" and the first and third classifiers would each produce metrics of "0.5." As a result, the use of multiple classifiers may improve performance as compared to techniques that use only one classifier. In this example, performance is improved because the metric of the target is further separated from that of the clutter. Moreover, if the feature values for the unknown objects in this example had both been input into the first classifier only, both objects would have the exact same metric of 0.5. As a result, the objects would not be distinguishable. Accordingly, training multiple classifiers and producing an overall metric as shown in this example may provide improved performance as compared to techniques that rely on a single classifier trained on non-segmented data.

In examples in which the multiple classifiers include classifiers of more than one type, the metric produced by each classifier may be normalized to a common scale. Such a normalization allows the metrics to be aggregated together without improperly or inadvertently weighting the output of a particular classifier as compared to the output of the other classifiers.

Whether the unknown object is a target is determined based on the overall metric (380). The unknown object may be considered to be a target if, for example, the overall metric exceeds a pre-determined threshold value.

In some implementations, whether an unknown object is a target may be determined purely from the signal being a specified level above the computed background. For example, if the signal exceeds a threshold that is set based on the background, the signal is deemed to be associated with a target. The signal may be based on, for example, the average amplitude from a subset of 21 frequencies measured by the CWMD.

In some implementations, the shape of the signal is employed in addition to or instead of the average amplitude of the frequencies. Discrimination between targets and clutter may be performed using a Support Vector Machine (SVM) classifier and a set of features derived from the distribution of the I/Q (for example, real/imaginary) frequency data measured at a 60 Hz rate by the CWMD sensor. An SVM may be used in, for example, scenarios in which a relatively small amount of data is collected. The set of features may include signal-to-noise ratio (SNR), the average real component across all frequencies measured by the CWMD, and a set of Discrete Spectrum of Relaxation Frequency (DSRF) values. The DSRF values may be an amplitude and position vector, and the DSRF value of an object is independent of an orientation of the object relative to the CWMD. The DSRF values are unique for different types and shapes of metal and thus provide a measure for quantifying the detection signature. For example, the mineralized rocks (rocks that have a non-zero metal content) have a flat signature, whereas mines and man-made clutter are curved and/or angled. The DSRF values may be unique for different types and shapes of metal and thus provide a measure for quantifying the detection signature. The DSRF values may be computed with data collected at 15 or more frequencies at which the CWMD operates. For example, the DSRF values may be computed based on data collected at 21 frequencies.

The processing discussed with respect to FIGS. 2-4 may be applied to data collected by a CWMD included in the sensor head 105 or the sensor head 150. As discussed above, the sensor head 105 and the sensor head 150 may include a CWMD and a GPR, and data from both of these sensors may be analyzed to determine whether a particular detection is a target (such as a mine or an IED).

Figure 5:
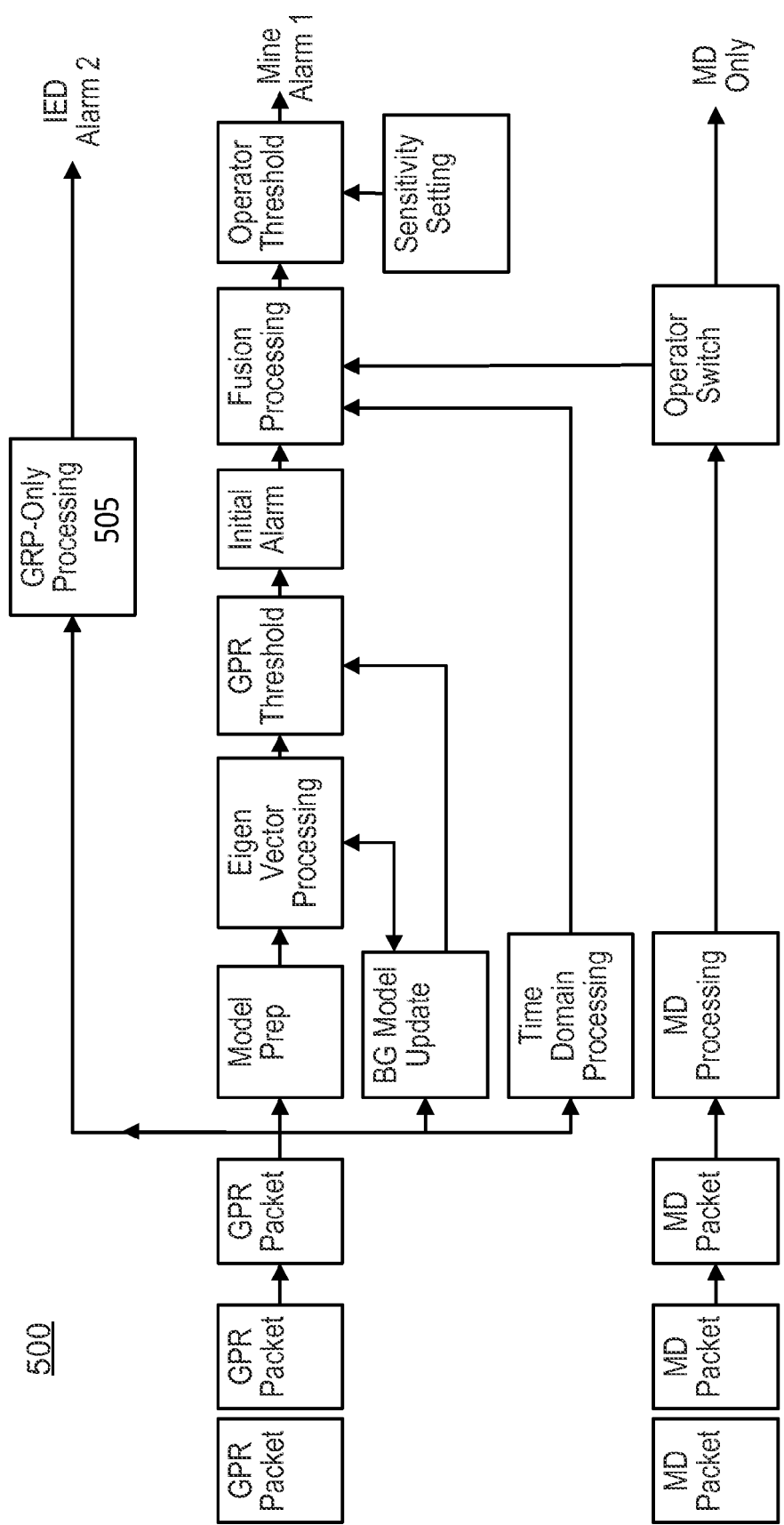
FIG. 5 shows an example of a multi-path process for analyzing sensor data.

FIG. 5 shows an example of a process 500 for analyzing data from a sensor head that includes a radar and a metal detector. The process 500 may be performed by one or more processors associated with the system 100, the sensor head 105, or the sensor head 150. The process 500 may be performed on data that was previously collected by these systems and/or sensors and stored for later use. The process 500 accepts data from a GPR (such as the GPR 129) and a metal detector (such as the CWMD 133), and the process 500 includes GPR-only processing path 505. The GPR-only processing path 505 is discussed in greater detail in FIGS. 7A and 7B.

To address challenges posed by processing techniques used in some prior systems, a parallel path is employed so the data from the GPR and the CWMD may be fused or not fused. If the data is not fused, the data from each of GPR and the CWMD may be considered to be used independently. For example, the process 500 allows GPR-only processing (such as in the GPR-only processing path 505), CWMD-only processing, or both. Other sensors may be used.

The GPR-only processing technique may be optimized for bulk zero-metal or low-metal IED detection and discrimination. The GPR-only processing alarms indicate the presence of a target or potential target on objects several inches or more in size (in any dimension), at any detectable depth (for example, up to several feet below the surface of the ground), composed mostly of dielectric material, and with low or zero metal content. Some implementations provide instant detect alerts over the GPR targets. In some implementations, the system 100 also may (or alternatively) includes processing that determines whether an improvised explosive device (IED) is present.

Operation of the system 100 may be sensitive to the precision of the operator swing motion as well as to surface artifacts such as foot prints and vehicle tracks. Range sidelobes are generated in the range (or time) domain as part of IFFT processing and, although the IED processing analyzes regions separated from (that is, away from) the air/ground interface, the range sidelobes from the air/ground interface may still extend into all ranges. As a result, a swing artifact may be inadvertently reported to the user as a detection.

In some implementations, the IED detection processing employs a change detection aspect that uses principal component analysis (PCA). The PCA maps the data from the sensor or sensors in the sensor head into a new coordinate space whereby the first coordinate is in the direction of maximum variance, the second coordinate is in the direction of the second largest variance, and so on. From the principal component analysis, a measured variance is obtained within each newly transformed coordinate. The measured variance may be used to model the ground clutter. During operation of the system 100, each radar packet may be transformed to the new coordinate space and compared against the model to determine if the radar packet represents an "outlier", and if so, a change detection is reported.

In some implementations, two simultaneous change detection algorithms are run, one focused on the detection of targets and one focused on the changes occurring specifically at the air/ground interface. By comparing the responses from these two change detection algorithms, it may be determined whether a detection is generated at an appropriate range for the target or if the detection is another fluctuation. Both swing artifacts and ground surface fluctuations should generate stronger change detection outputs at the air/ground interface while targets should generate a stronger response below the air/ground interface.

Figure 6A:
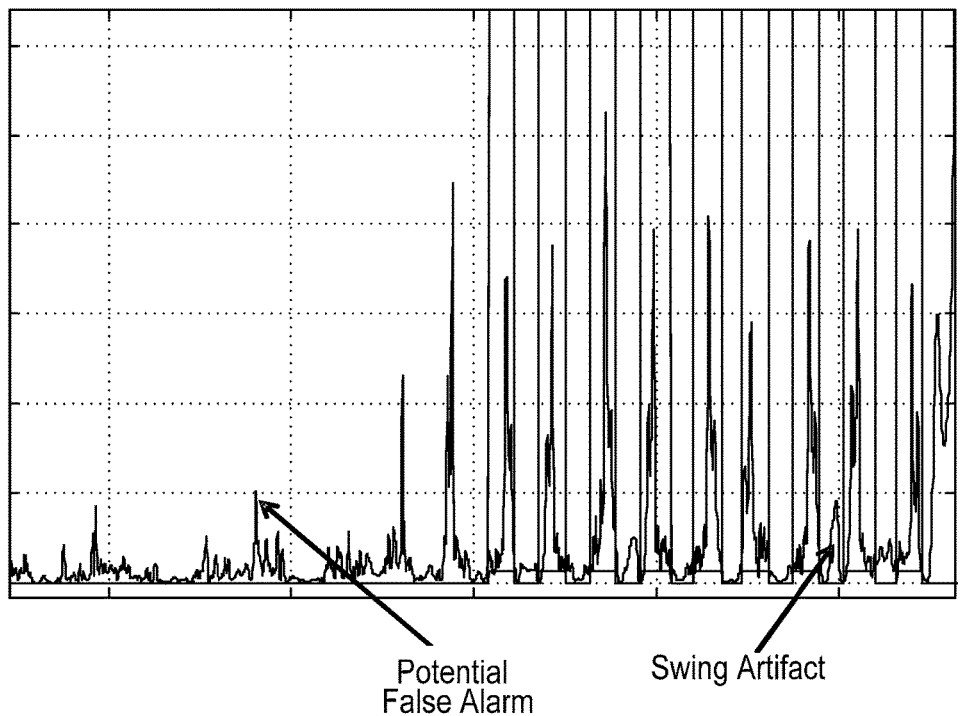
FIGS. 6A and 6B show example data derived from data from the system of FIG. 1A.
Figure 6A:
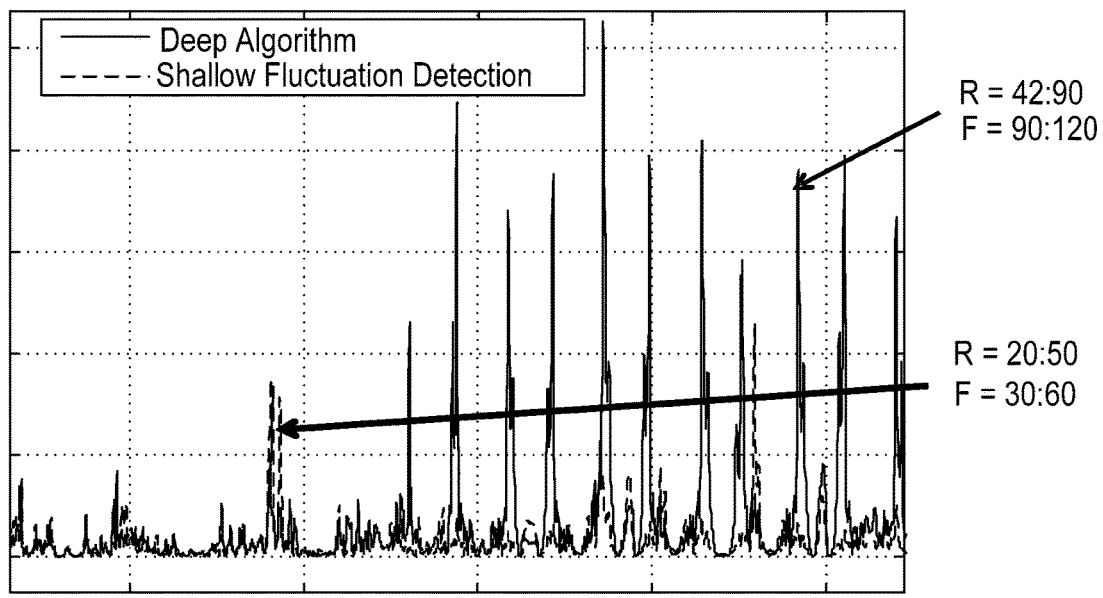

The following illustrates how the ratio test acts to reduce potential false alarms. FIG. 6A shows a potential false alarm and swing artifact evident as spikes in the change detection algorithm output.

Figure 6B:
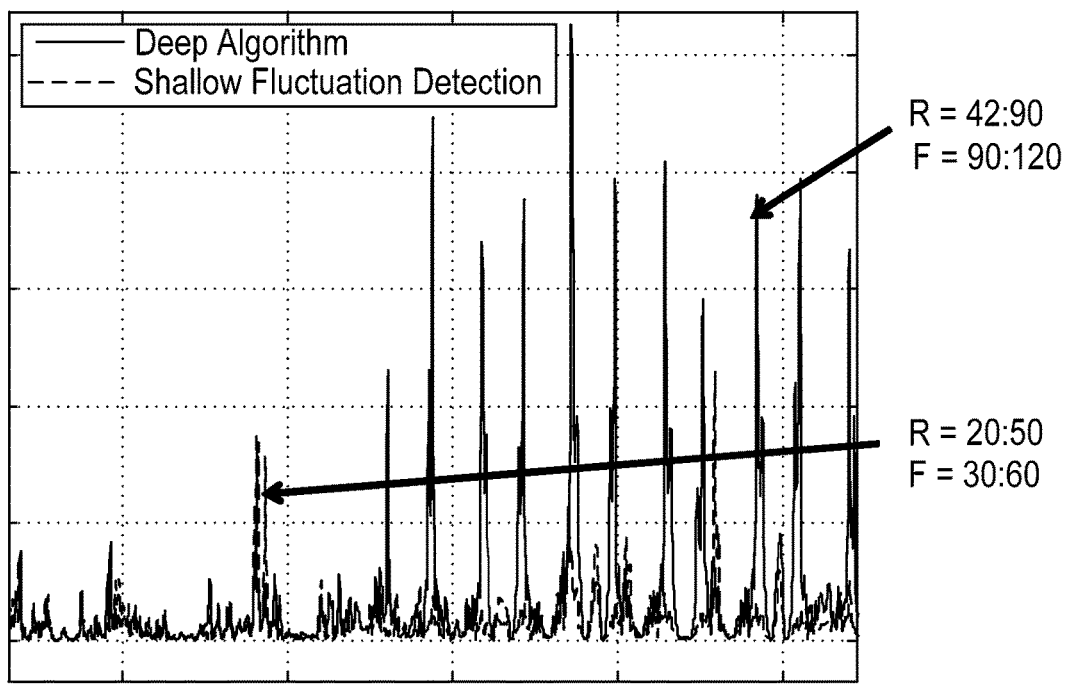
Figure 6B:
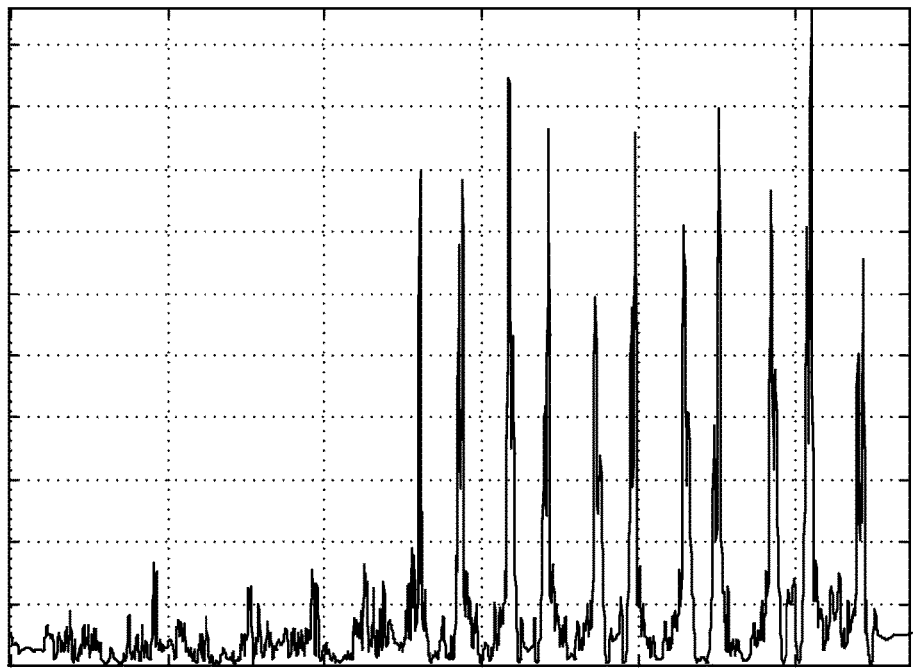

FIG. 6B shows an example result after performing a ratio test between the target and surface response. In these examples, the swing artifacts as well as strong false alarm response are both reduced.

Figure 7A:
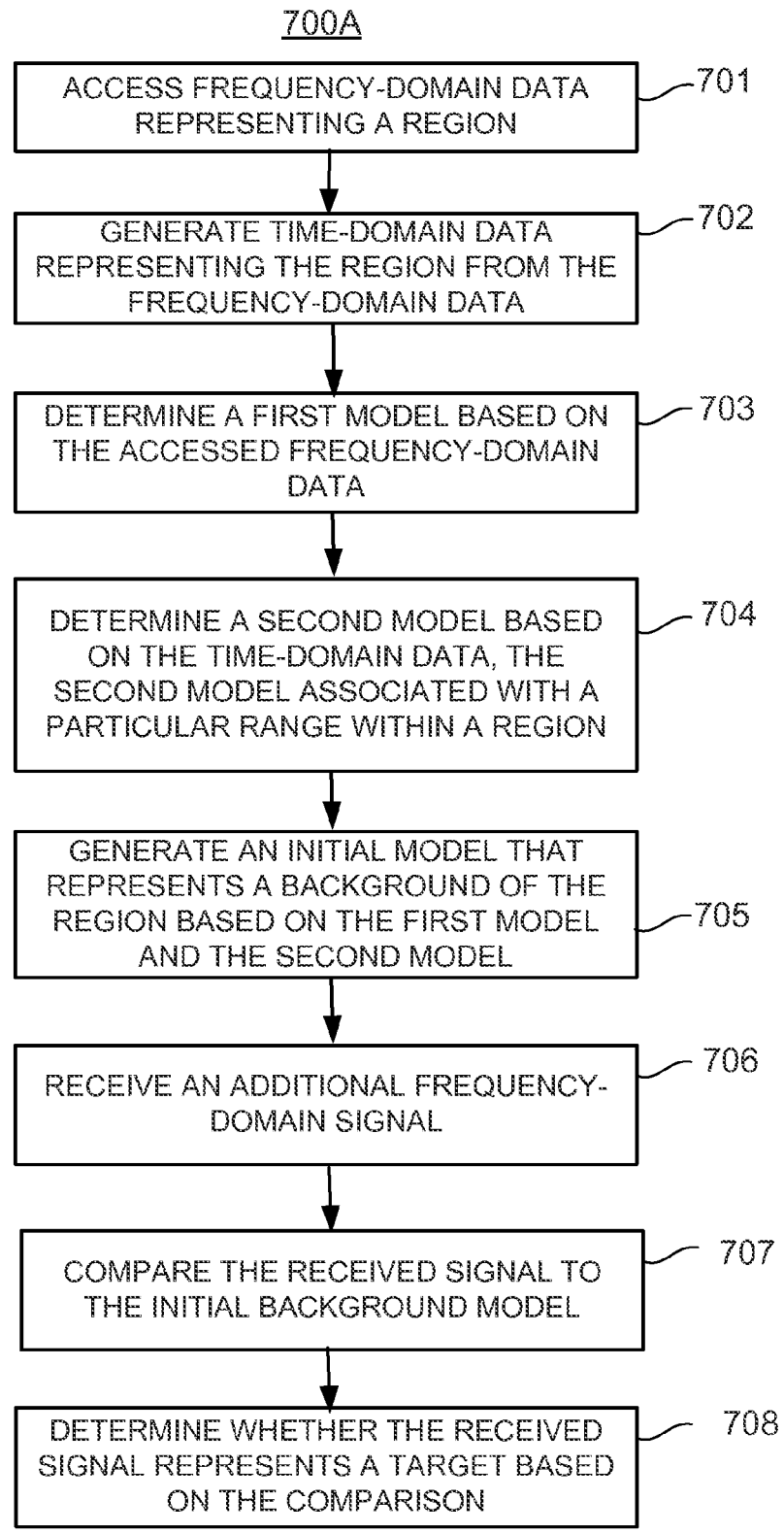
FIG. 7A shows an example process for using frequency-domain data.
Figure 7B:
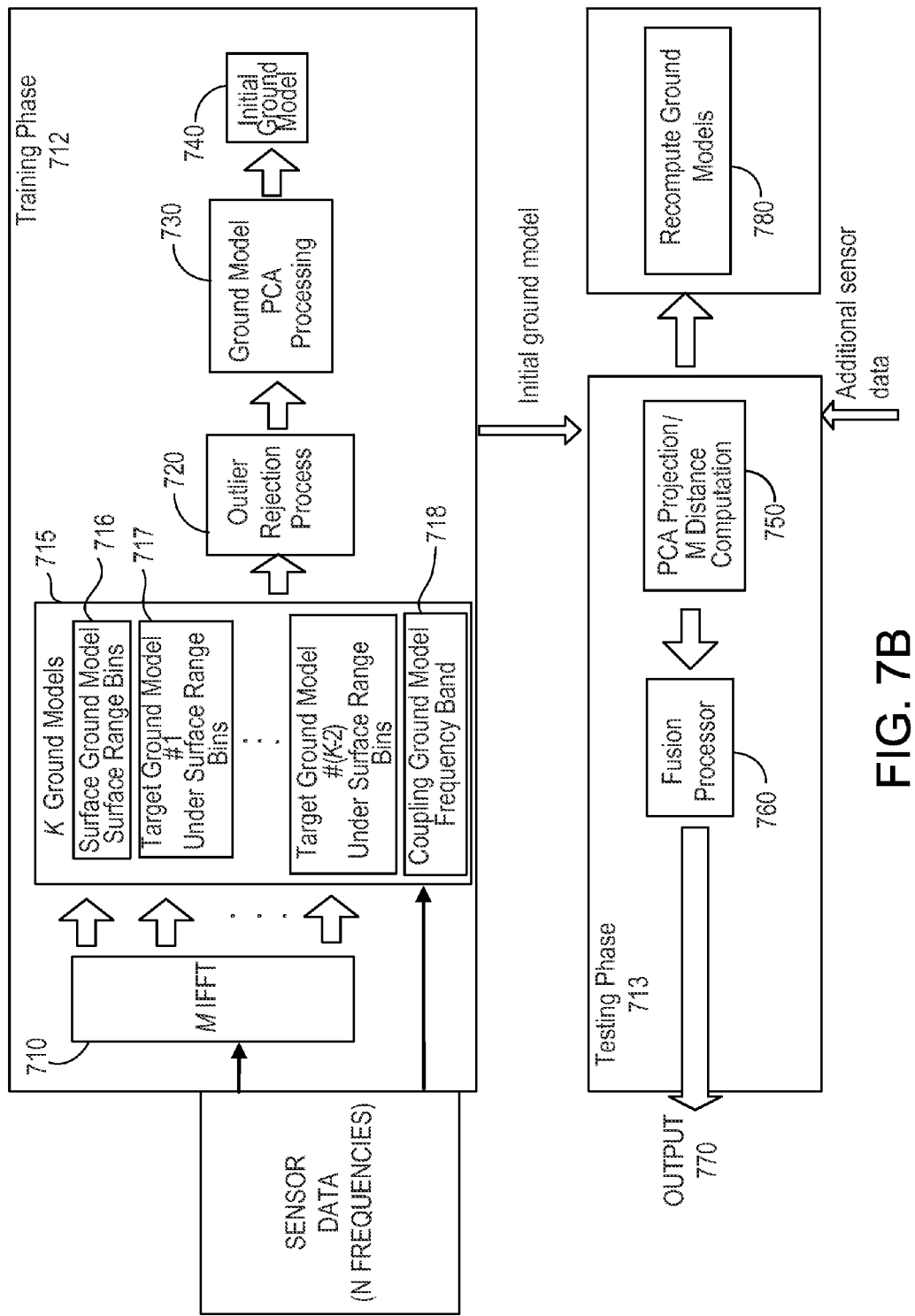
FIG. 7B shows another example process for using frequency-domain data.

Referring to FIG. 7A, an example process 700A for detecting items such as IEDs and small wires is shown. Referring to FIG. 7B, a block diagram of another example process for detecting items such as IEDs and small wires is shown. The examples shown in FIGS. 7A and 7B may be performed using data from a ground penetrating radar (GPR), and the process 700A or 700B may be implemented in the "GPR-only Processing" path 505 shown in FIG. 5.

Each of the processes 700A and 700B may be performed by one or more electronic processors included in the system 100 or in communication with the system 100, the sensor head 105, or the sensor head 150.

In some implementations, the GPR collects data in the frequency domain. That is, the GPR produces radar signals at multiple frequencies and measures an amplitude and/or phase of a signal return from a surface of the ground and from items in or under the surface of the ground at each frequency. Accordingly, the data from the GPR may be considered to be in the frequency domain. As discussed below, the frequency-domain data may be used directly (that is, without being transformed into the time domain) as part of a determination of whether an item is present on, within, or under a surface of the ground.

The frequency-domain data from the GPR may be used to generate one or more models that allow suppression of false alarms that may arise from environmental artifacts, such as surface characteristics (for example, tire ruts or footprints), and from motion artifacts, such as artifacts caused by unexpected motion of an operator of the GPR. A false alarm is a detection that is incorrectly classified as a target (such as a buried IED). Incorrectly classifying a benign object (such as surface roughness) as a target may cause a reduction in performance. For example, detections classified as targets may be subject to further processing by an electronic processor and/or examination by an operator of the system. Thus, the presence of incorrectly classified benign objects may cause an increase in the amount of time required to scan a particular area due to, for example, increased processing time. Using the frequency-domain data from the GPR as discussed below may result in the number of false alarms being reduced by a factor two or more, leading to a performance improvement. In some implementations, for example, the improvement may be three or four fold, or perhaps more.

The techniques discussed with respect to FIGS. 7A and 7B may reduce the number of false alarms by generating several ground models during a training phase and arithmetically combining their Mahalanobis (M) Distance during a testing phase (when additional data is received) to identify anomalies buried under the ground. Initially, N Stepped-Frequency Continuous Wave (SFCW) Ground Penetrating Radar (GPR) frequencies are transmitted into the ground. The signal return (or surface ground return) of those frequencies is stored as frequency-domain data and the Inverse Fast Fourier Transform (IFFT) is used to generate a time (range) domain data representation. A set of K ground models are generated, where K is an integer value, and (K-2) number of the K ground models represent signals where targets of interest are likely to be found from a range domain standpoint (the K-2 models may be referred to Target Ground Models). The remaining two ground models of the K ground models represent signals where sources for clutter are found or are likely found. The two clutter ground model sources are the ground model representing the ground surface (in the range domain) and a frequency coupling ground model (in the frequency domain). The frequency coupling ground model represents the frequencies that are excited when an operator exhibits swing fluctuations.

All of the K ground models may be analyzed with an outlier rejection processing stage, where the surface ground return is analyzed to identify if a sample packet is an outlier from the rest of the training data packets. A sample packet or a packet may be a signal return or a ground signal return. The mean (average) value and the standard deviation of the amplitude and/or phase of the signals in each of the K ground models may be computed, and an outlier packet may be any particular signal that is one or more standard deviations less than or greater than the average value. Once outliers have been removed from the dataset, Principle Components Analysis (PCA) processing is performed on each ground model and the largest V singular values and components are saved for the testing processing stage, where V is a positive integer number. Also, a retraining processing phase may be spawned after a threshold number of non-outlier packets have been collected through the testing phase. The retraining processing phase updates all K ground models. The threshold number of non-outlier packets may correspond to a number of packets that are detected by the system in ten seconds of typical operation.

During the Testing Phase, each packet is projected into the PCA space of each of the K ground models. The M distance of each ground model is computed using only the largest V components of the ground models. Finally, a fusion processor computes a Signal-to-Clutter metric based on the M Distance of all ground models where an arithmetic combination of the target ground models is divided by an arithmetic combination of the clutter ground models. A Fused M Distance Metric Threshold is computed using the Fused M Distance Metric output and an IED detection is triggered via the IED Detection Alert when the Fused M Distance exceeds the Fused M Distance Threshold for a predetermined period of time.

FIG. 7A shows an example of process 700A used to process frequency-domain data. The process 700A may be performed by one or more processors included in, or in communication with, a system that includes a GPR, such as the system 100.

Frequency-domain data that represents a spatial region is accessed (701). The frequency-domain data may include, for example, an amplitude and phase of a radar return generated by directing multiple-frequency radiation from a ground penetrating radar at the surface of the Earth and detecting the return that is reflected from the surface and subsurface regions at each of the multiple frequencies. The generated radiation and the reflected return may include, for example, 140 discrete frequencies or discrete frequency bands.

The frequency-domain data may be accessed from an electronic storage that stores frequency-domain data collected during a previous data collection, or the frequency-domain data may be data that is collected by the GPR and stored in a temporary buffer for subsequent, though near-real time, analysis. In some implementations, the frequency-domain data is accessed by being provided by the system 100 to a separate electronic processor for analysis.

Time-domain data representing the spatial region is generated from the frequency-domain data (702). The spatial region may be the surface of the ground and regions beneath the surface of the ground to a depth of penetration of the radar signal. The time-domain data may be generated by, for example, performing an inverse Fourier transform on the frequency-domain data. The time-domain data represents an amplitude of the radar signal as a function of time. Because the time for the radar return signal to reach the detector correlates with the depth from which the return signal emanates, the time-domain data also may be referred to as range-domain data that represents the strength of the radar return as a function of depth beneath the surface (or distance from the sensor).

A first model is determined based on the accessed frequency-domain data (703). The first model may be referred to as a coupling ground model, and the first model is in the frequency domain. The coupling ground model identifies those frequencies (within the multiple frequencies that are included in the radar signal) that are excited in response to operator-induced artifacts in the data, such as artifacts caused by operator jitter and/or incorrect operator motion of the sensor. As discussed below, the first model is used to divide, reduce, minimize, or remove the frequencies that are excited or otherwise enhanced by unexpected operator motion. In other words, the first model is used to reduce or eliminate clutter that arises from the motion of an operator of the system 100.

A second model is determined based on the generated time-domain data, and the second model is associated with a particular range within the spatial region (704). The second model may include more than one model, and, the total number of first and second models together may be an integer number "K." Collectively, the first and second models may be referred to as the "K ground models." The second model includes a model of the surface of the ground ("surface ground model"), which is determined from time-domain (range-domain) data that is reflected from the surface. The surface model includes one or more time-domain signals that are representative of a signal returned from the surface of the ground.

The second model also may include one or more models that are associated with a particular sub-surface region. Each of these models may be referred to as a "ground target model," and each model represents signals where targets of interest are likely to be found from a range-domain perspective. For example, one model may represent a region from just below the surface to a depth of several inches, and another model may represent a region that is deeper than a depth of several inches.

An initial background model is generated based on the first model and the second model (705). The background model represents a background of the region, and the background may be considered to be everything in the region other than targets. Thus, the background includes natural features such as soil and rocks, and the background may vary with the environment. To determine the background model, each of the K ground models may be processed with principal components analysis (PCA) to determine which of the frequencies contributes the most to the K ground models (that is, those frequencies that tend to change the most in the presence of a background or a target). The largest "V" singular values and components of the K ground models from the PCA are stored for later use, where "V" is a positive integer value. In some implementations, each of the K ground models is analyzed for outliers, and any outliers are removed before the initial background model is generated.

An additional frequency-domain signal is received (706). The additional frequency-domain signal may be received after the initial background model is generated. For example, the additional frequency-domain signal may be radar returns received as the system 100 travels through a region to scan the region for IEDs. The additional frequency-domain data may be any raw sensor data that is in the frequency-domain. In some implementations, the additional frequency-domain signal is analyzed to determine whether the additional frequency-domain signal is an outlier. When the number of additional frequency-domain signals that are not outliers exceeds a predetermined number, each of the K ground models is recomputed. Because the background may change when, for example, the system 100 travels from a region that is unimproved to a region (such as a paved road) that is improved, recalculating the K ground models may further improve performance. The number of non-outliers needed to exceed the predetermined number may correspond to the number of data packets (or return signals) received in a predetermined time under typical operating conditions of the GPR (or other sensor). For example, the predetermined number may be set such that the K ground models are updated, for example, approximately every few seconds, approximately every few minutes, or approximately every hour. In some other implementations, the update time may vary according to the environment in which the system 100 is operating. If the environment remains generally unchanged, then updates to the K ground models are relatively small.

The additional frequency-domain signal is compared to the initial background model (707) to determine how similar the additional frequency-domain signal is to the initial background model. A greater dissimilarity indicates a higher likelihood that the additional frequency-domain signal represents a target rather than the background. In some implementations, to determine the similarity between the background model and the additional frequency-domain signal, the Mahalanobis distance (M-distance) of each of the K ground models computed using only the largest "V" components of the K ground models found in (705). A signal-to-clutter metric (SCM) based on the M-distance may be determined. In some implementations, the signal-to-clutter ratio is determined from an arithmetic combination of the target ground models is divided by an arithmetic combination of the clutter ground models (the surface ground model and the coupling ground model) according to Equation 1:

SCM=SUM(target ground models)/(surface ground model+coupling ground model).

Whether the received signal represents a target is determined (708). Application of a threshold to a metric, such as the M-distance and/or to the SCM may indicate whether a target is present or not. If the metric is above or equal to the threshold, a target is present. If a target is determined to be present, an alarm may be activated. The alarm may be, for example, a visual alarm and/or an audible alarm. In some implementations, the alarm is activated when the metric exceeds the threshold for a predetermined amount of time.

Referring to FIG. 7B, a block diagram of another example process 700B is shown. The example process 700B includes a training phase 712, a testing phase 713, and a retraining phase 714. Sensor data that includes data at N different frequencies is input into the training phase 712. The sensor data may be data from a ground penetrating radar. An inverse Fourier transform of the sensor data is performed (710), and the resulting time (range) domain data is used to determine K number of ground models 715. In this example, K is a positive integer greater than two. The K ground models 715 include a surface ground model 716, (K-2) target ground models 717, and a coupling ground model 718.

The surface ground model 716 is a time-domain model of radar signals reflected from the surface of the ground. Each of the target ground models 717 includes signals from a particular subsurface region. For example, one target ground model may represent a region one to two centimeters below the surface and another target ground model may represent a region seven to ten centimeters below the surface. The coupling ground model 718 is a frequency-domain model derived directly from the sensor data, and the coupling ground model 718 represents the frequencies that are excited when, for example, an operator of the system 100 causes unexpected swing fluctuations. Together, the surface ground model 716 and the coupling ground model 718 may be considered "ground clutter models."

The K ground models are analyzed with an outlier rejection process 720. The surface return signals in each of the K ground models is analyzed to determine whether a particular signal is an outlier compared to the remaining signals. Any outliers that are found are removed from the K ground models, and the K ground models are analyzed with principal component analysis (PCA) 730. The PCA processing determines the largest "V" singular values and components (the frequencies that cause the most variance in the data), and these components are saved for the testing phase 713. The initial ground model 740 is generated based on the results of the PCA. The initial ground model 740 is made available for use during a testing phase 713.

During the testing phase 713, additional sensor (GPR) data, similar to the sensor data used in the training phase 712 but collected at a later time, is analyzed to determine whether the additional sensor data includes a target (such as a buried IED or a small wire used to detonate an explosive). A PCA projection/M distance computation module 750 performs a PCA projection and determines an M distance for each of the K ground models. Each packet of GPR data is projected into the PCA space of each of the K ground models, and the M distance of each ground model is computed using only the largest "V" components found during the PCA processing of the K ground models. A fusion processor 760 determines a signal-to-clutter metric (SCM) based on the M distance of each of the K ground models. The SCM may be determined using Equation 1. A threshold is applied to an output 770 of the fusion processor 760. If the output 770 meets or exceeds the threshold, the GPR data packet is sufficiently different from the background to be deemed a target. Otherwise, the GPR data packet is not deemed a target.

In some implementations, a retraining phase 714 is triggered when a threshold number of non-outlier data packets are received. The recompute ground models module 780 causes the K ground modules 715 to be regenerated based on data that the GPR is currently, or has recently, produced.

Although the examples discussed with respect to FIGS. 7A and 7B are primarily related to GPR, the processing is applicable to other types of sensors as well. Further, the IED processing discussed above may be used in combination with other GPR processing techniques and techniques used to process data from other sensors.

The above examples discuss the benefits of example processing techniques that, when applied to GPR data, may improve detection of IEDs and small wires. Additionally, a CWMD, used alone or in combination with a GPR, also may be used to detect IEDs and small wires.

Some IED threats contain minimum or zero metal content as well as types of metal that are not easily detectable—if at all—by available pulsed metal detector (MD) systems. The continuous wave metal detector (CWMD), such as the CWMD discussed above, may provide detection of metals and fusing methods that pulsed systems cannot. For example, the CWMD may detect non-ferrous metals such as many types of stainless steel/titanium, wires used to detonate IEDs (for example, simple speaker wire), and threats that may be hidden or shadowed by neighboring metal in doorways or simply by metal debris. In some implementations, the CWMD transmits over twenty-one frequencies (in a frequency range of, for example, 300 Hz-90 kHz) through a dedicated transmit coil and continuously receives all frequencies using a dedicated receive coil. The CWMD's 24-bit dynamic range conversion supports compensating for both fixed nearby metal (such as the GPR antennas and the sensor head mounted transceiver board) as well as dynamic sources, such as mineralized soils, in real time.

The coherent MD (or CWMD) design also achieves may achieve lower noise operation and may allow the generation of an expanded feature space via processing of in-phase (I) and quadrature (Q) signals just as from the GPR. This may provide increased performance, and this additional information provides improved discrimination.

In some implementations, the data from the CWMD may be determined as detections purely from the signal being a specified level above the computed background. The signal may be computed as the average amplitude from a subset of twenty-one frequencies measured.

Figure 8:
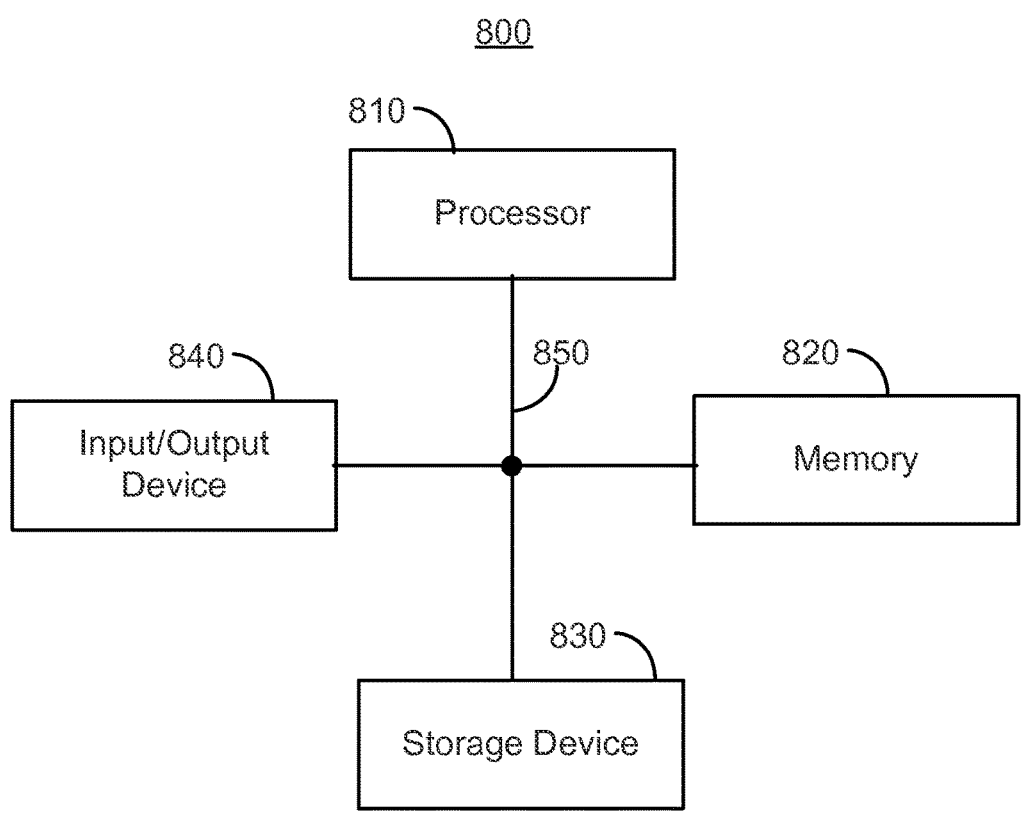
FIG. 8 shows a computer system for use with the system shown any of the proceeding FIGS.

FIG. 8 is a block diagram of a computer system 800 that can be used in the operations and systems described above, according to one implementation. The system 800 includes a processor 810, a memory 820, an electronic storage 830 and an input/output interface 840. Each of the components 810, 820, 830 and 840 are interconnected using a system bus 850. The processor 810 is capable of processing instructions for execution within the system 800. In some implementations, the processor 810 is a single-threaded processor. In another implementation, the processor 810 is a multi-threaded processor. The processor 810 is capable of processing instructions stored in the memory 820 or on the electronic storage 830 to display graphical information for a user interface on the input/output interface 840. The processor 810 may be coupled to another element, such as a sensor within the sensor head 105, 150 by being electrically coupled to the sensor and able to exchange data and signals with the sensor.

The memory 820 stores information within the system 800. In one implementation, the memory 820 is a computer-readable medium. In another implementation, the memory 820 is a volatile memory unit. In still another embodiment, the memory 820 is a non-volatile memory unit.

The electronic storage 830 is capable of providing mass storage for the system 800. In one embodiment, the storage device 830 is a computer-readable medium. In various different embodiments, the storage device 830 may be a floppy disk device, a hard disk device, an optical disk device, or a tape device.

For example, the system 100, discussed previously with respect to FIGS. 1A-1E, may include the processor 810 executing computer instructions that are stored in one of memory 820 and storage device 830.

The input/output device 840 provides input/output operations for the system 800. In one implementation, the input/output device 840 includes a keyboard and/or pointing device. In another implementation, the input/output device 840 includes a display unit for displaying graphical user interface as discussed above.

The techniques can be implemented in digital electronic circuitry, or in computer hardware, firmware, software, or in combinations of them. The techniques can be implemented as a computer program product, that is, a computer program tangibly embodied in an information carrier, in a machine-readable storage device, in machine-readable storage medium, in a computer-readable storage device, in computer-readable storage medium, or in a propagated signal, for execution by, or to control the operation of, data processing apparatus, such as a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques can be performed by one or more programmable processors executing a computer program to perform functions of the techniques by operating on input data and generating output. Method steps can also be performed by, and apparatus of the techniques can be implemented as, special purpose logic circuitry, on, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

A number of implementations of the techniques have been described. Nevertheless, it will be understood that various modifications may be made without departing from the spirit and scope of the claims. For example, useful results still could be achieved if steps of the disclosed techniques were performed in a different order and/or if components in the disclosed systems were combined in a different manner and/or replaced or supplemented by other components.

For example, although the system shown in FIG. 1A is a handheld system intended to scan the surface of the ground, the sensor head 105 may be mounted on a fixed platform (such as a portal) through which persons pass and are scanned for harmful objects. The sensor head 105 may be used to scan persons or luggage for explosives, small wires, and metal.

Instead of being mounted on the wand 107, the sensor head 105 may be mounted on a vehicle, a platform that is manually or robotically operated, or a movable cart. In these implementations, the cable 109 is used to communicate data to and/or from the sensor head 105 to electronics associated with the vehicle, platform, or movable cart. The sensor head 150 also may be mounted in any of these configurations and used in any of these situations.

In some implementations, the wand 107 may be non-collapsible. For example, the wand 107 may be a fixed-form wand used to scan human persons for hazardous objects. The sensor head 105 may be mounted on a fixed platform such that the sensor head 105 scans objects as the objects pass through the range of the sensors in the sensor head 105.

The sensor head 105 may include the CWMD 133 without a GPR or other type of radar, and the sensor head 105 may include the CWMD 159 without a GPR or other type of radar. In yet other implementations, the sensor head 105 includes only the GPR 129 and the transmitter 127 that allows for simplified cabling.

The processing techniques discussed with respect to, for example, FIGS. 2, 3, 4, 7A, and 7B may be applied to data collected by and received from the sensors included in the sensor head 105 but stored for later analysis or the processing techniques may be applied during operation of the system 100 and the sensor head 105.

What is claimed is:

1. An apparatus comprising:
an extendable wand; and
a sensor head coupled to the wand by a hinged joint, the sensor head comprising a continuous wave metal detector (CWMD) and a radar, wherein the apparatus is configured to be collapsed into a storage configuration in which the wand is collapsed and folded over the sensor head at the hinged joint.

2. The apparatus of claim 1, further comprising a platform coupled to the wand by a second hinged joint, wherein the platform is configured to fold, at the second hinged joint, alongside the wand into the storage configuration.

3. The apparatus of claim 1, wherein the radar comprises one receive antenna configured to detect electromagnetic radiation and one transmit antenna configured to transmit electromagnetic radiation.

4. The apparatus of claim 2, further comprising a grip coupled to the wand and configured to fold alongside the wand into the storage configuration.

5. The apparatus of claim 3, further comprising a transceiver electrically coupled to the receive antenna and the transmit antenna, wherein the transceiver, the receive antenna, the transmit antenna, and the CWMD are located in the sensor head.

6. The apparatus of claim 5, further comprising a processor and electronic storage electrically coupled to the transceiver by a universal serial bus (USB) wire or a coiled wire.

7. The apparatus of claim 1, wherein, when the wand and sensor head are in a collapsed orientation, the apparatus fills a volume no larger than about 36 centimeters (cm) by 26 cm by 11 cm.

8. The apparatus of claim 1, further comprising a housing coupled to the wand by a second hinged joint, the housing comprising a processor and electronic storage in communication with the sensor head, the electronic storage comprising instructions that, when executed, cause the processor to:
access data from the CWMD and from the radar,
determine a signature of an object detected by one or more of the CWMD or the radar based on the accessed data, and
wherein the housing is configured to fold, at the second hinged joint, alongside the wand when in the storage configuration.

9. The apparatus of claim 8, further comprising a grip coupled to the wand and configured to fold alongside the wand into the storage configuration.

10. The apparatus of claim 1, further comprising an output device configured to provide an indication of a detection of an object made by one or more of the CWMD or the radar.

11. The apparatus of claim 1, wherein the CWMD transmits and receives radiation at one or more different frequencies depending on a target of interest.

12. The apparatus of claim 1, wherein the CWMD comprises:

a first coil configured to transmit an electromagnetic field; and
a second coil configured to detect an electromagnetic field generated by currents induced in an object in response to being irradiated by the transmitted electromagnetic field.

13. The apparatus of claim 1, wherein the CWMD is at an outer edge or portion of the sensor head.

14. An apparatus comprising:
an extendable wand having a first end and a second end, opposite the first end;
a sensor head coupled to the wand at the first end by a first hinged joint, the sensor head comprising a continuous wave metal detector (CWMD) configured to radiate electromagnetic radiation and detect electromagnetic radiation, wherein the sensor head is configured to fold, at the first hinged joint, alongside the wand when in a storage configuration; and
a housing coupled to the wand at the second end by a second hinged joint, the housing comprising a processor and an electronic storage coupled to the CWMD, the electronic storage comprising instructions that, when executed, cause the processor to access data detected by the CWMD and determine a signature of an object represented by the accessed data, wherein the housing is configured to fold, at the second hinged joint, alongside the wand when in the storage configuration.

15. The apparatus of claim 14, wherein the CWMD is configured to radiate and detect radiation at twenty-one or more different frequencies.

16. The apparatus of claim 14, wherein the data detected by the CWMD comprises quadrature and in-phase data that represents a second electromagnetic radiation.

17. The apparatus of claim 14, where the data detected by the CWMD enables the processor to determine that signature independent of an orientation or position of the object relative to the CWMD.

18. An apparatus comprising:
an extendable wand having a first end and a second end, opposite the first end;
a sensor head coupled to wand at the first end by a first hinged joint, the sensor head comprising a metal detector configured to radiate and detect radiation, wherein the sensor head is configured to fold, at the first hinged joint, alongside the wand when in a storage configuration; and
a housing coupled to the wand at the second end by a second hinged joint, the housing comprising a processor and an electronic storage coupled to the metal detector, the electronic storage comprising instructions that, when executed, cause the processor to access data detected by the metal detector and determine that an object is represented by the accessed data, wherein the housing is configured to fold, at the second hinged joint, alongside the wand when in the storage configuration.

19. The apparatus of claim 1, further comprising a grip coupled to the wand and configured to fold alongside the wand when in the storage configuration.

20. The apparatus of claim 18, further comprising a radar and a transceiver in the sensor head.

* * * * *